Nov. 27, 1962

L. C. McCARTY, JR 3,065,799

ROTARY WING AIRCRAFT

Filed April 21, 1958

INVENTOR.
LEWIS C. McCARTY, JR.
BY
Kenyon & Kenyon
ATTORNEYS

Nov. 27, 1962 — L. C. McCARTY, JR — 3,065,799
ROTARY WING AIRCRAFT
Filed April 21, 1958 — 16 Sheets-Sheet 2

INVENTOR.
LEWIS C. McCARTY, JR
BY Kenyon & Kenyon
ATTORNEYS

Nov. 27, 1962   L. C. McCARTY, JR   3,065,799
ROTARY WING AIRCRAFT
Filed April 21, 1958   16 Sheets-Sheet 3

INVENTOR.
LEWIS C. McCARTY, JR
BY Kenyon & Kenyon
ATTORNEYS

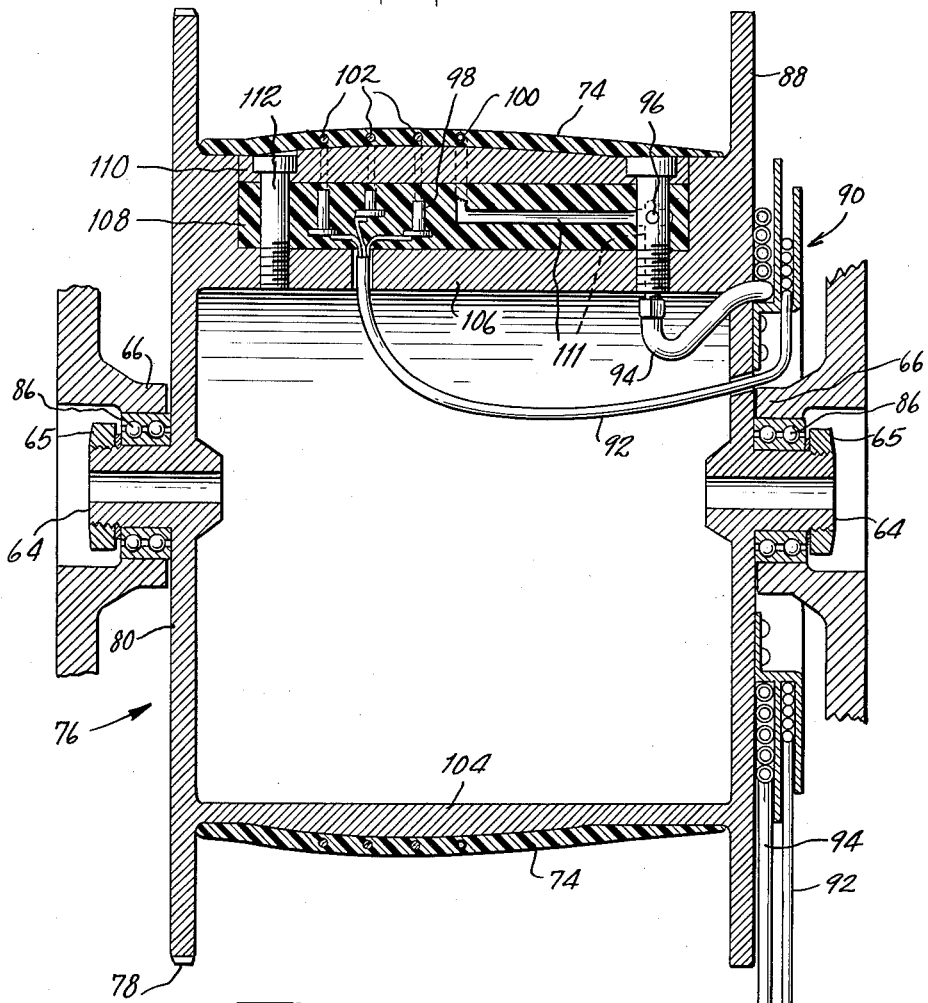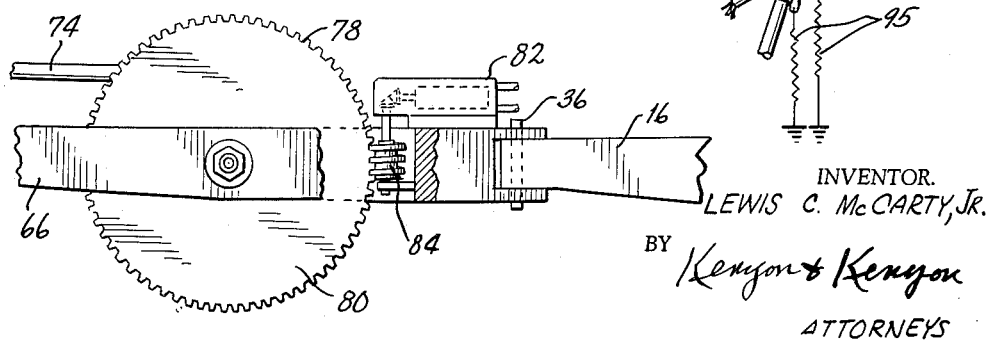

Nov. 27, 1962
L. C. McCARTY, JR
3,065,799
ROTARY WING AIRCRAFT
Filed April 21, 1958
16 Sheets-Sheet 5
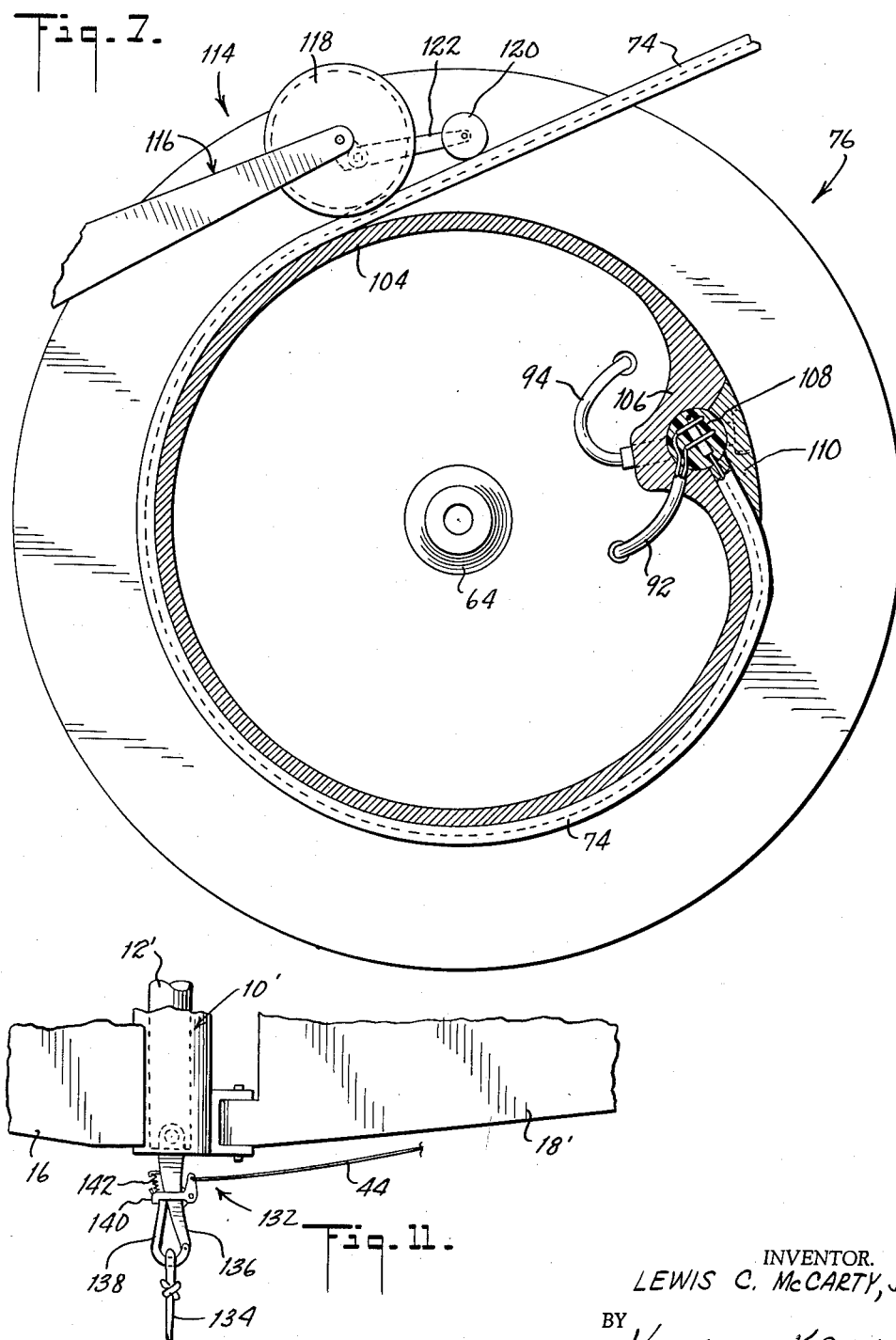
INVENTOR.
LEWIS C. McCARTY, JR.
BY Kenyon & Kenyon
ATTORNEYS

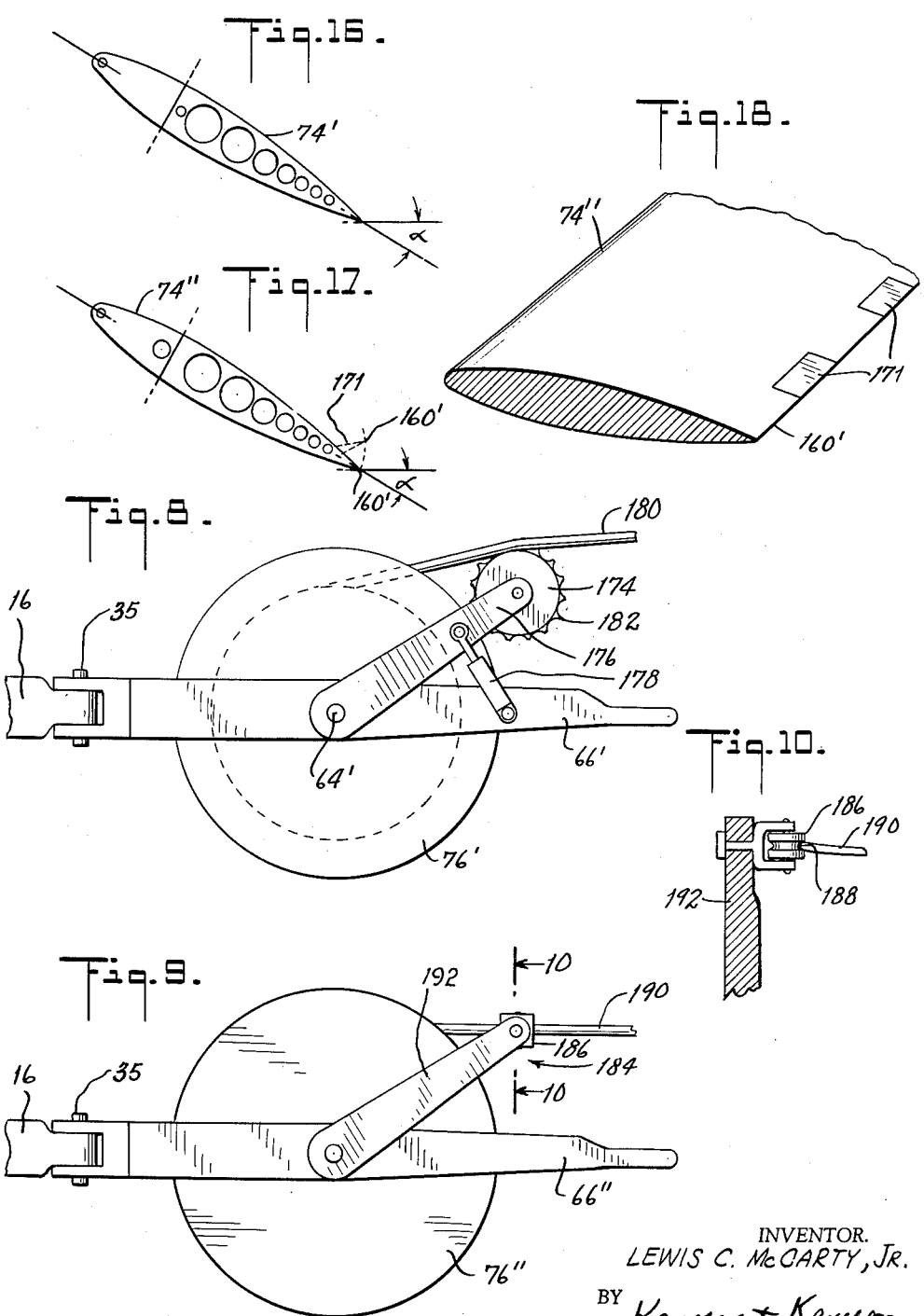

Nov. 27, 1962

L. C. McCARTY, JR 3,065,799

ROTARY WING AIRCRAFT

Filed April 21, 1958

INVENTOR.
LEWIS C. McCARTY, JR.
BY Kenyon & Kenyon
ATTORNEYS

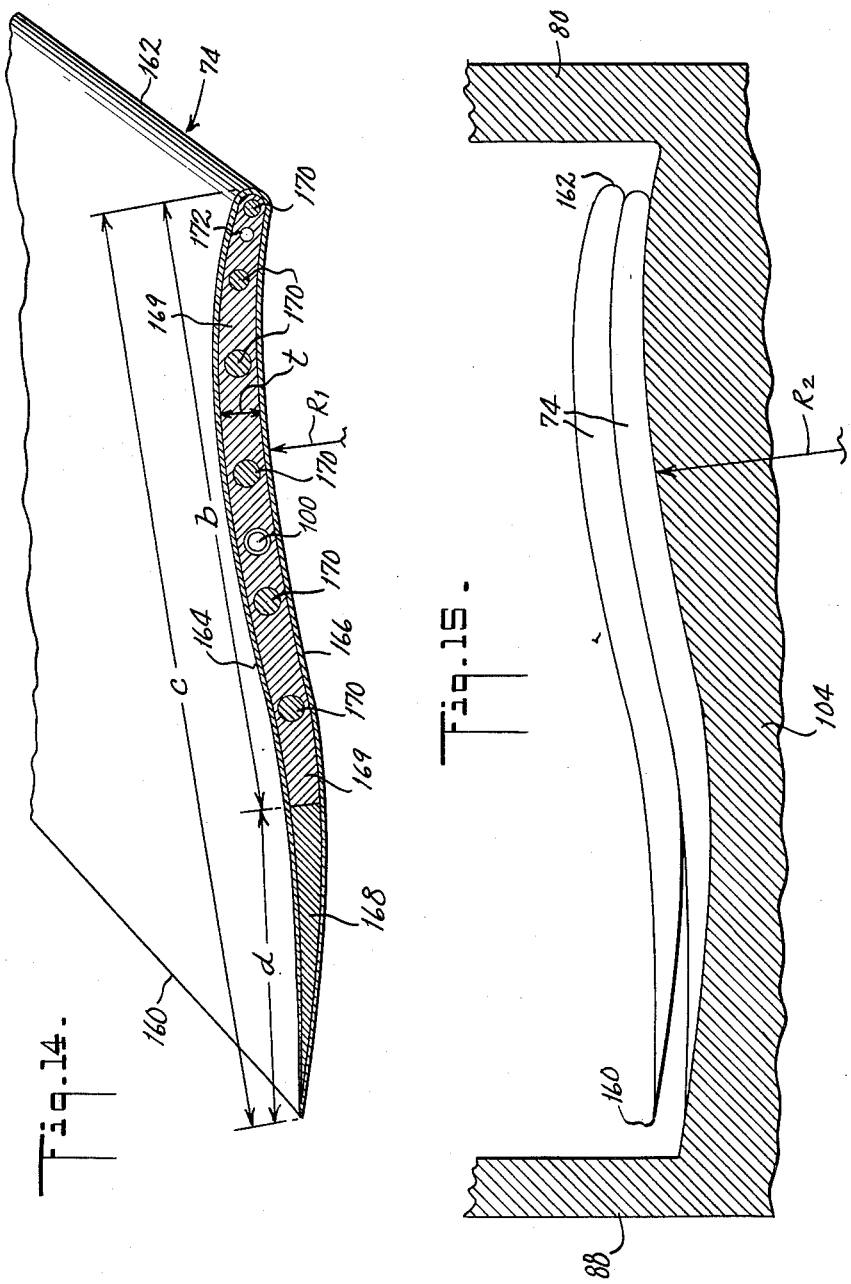

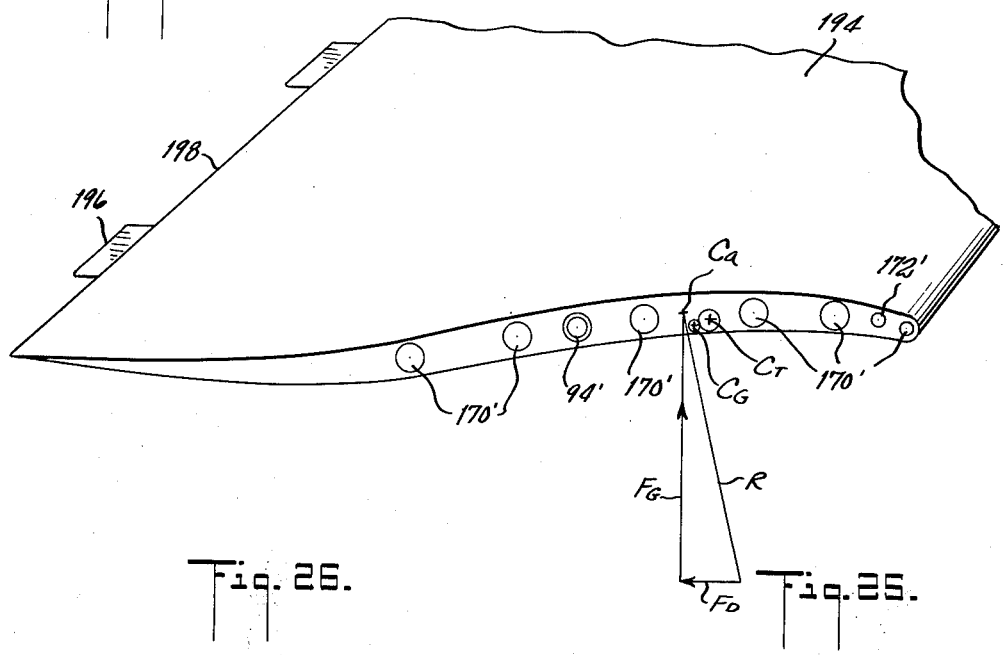
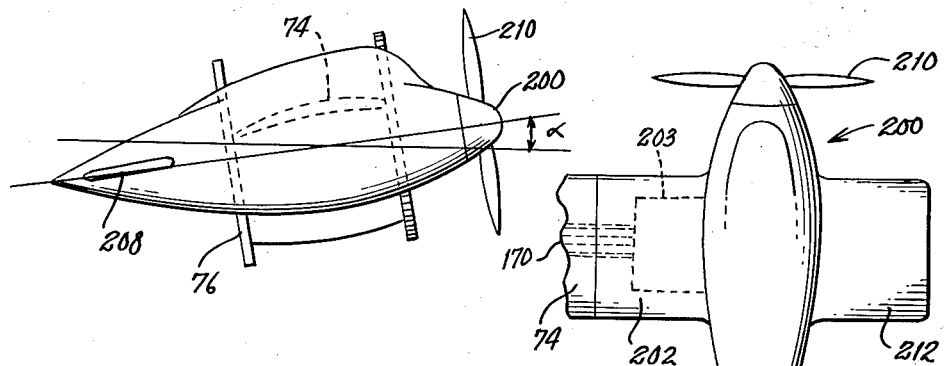
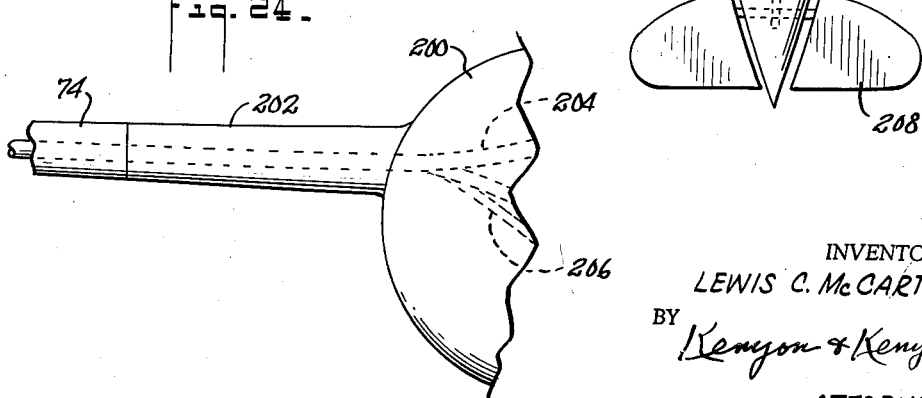
INVENTOR.
LEWIS C. McCARTY, JR.
BY Kenyon & Kenyon
ATTORNEYS Nov. 27, 1962  L. C. McCARTY, JR  3,065,799
ROTARY WING AIRCRAFT
Filed April 21, 1958  16 Sheets-Sheet 11
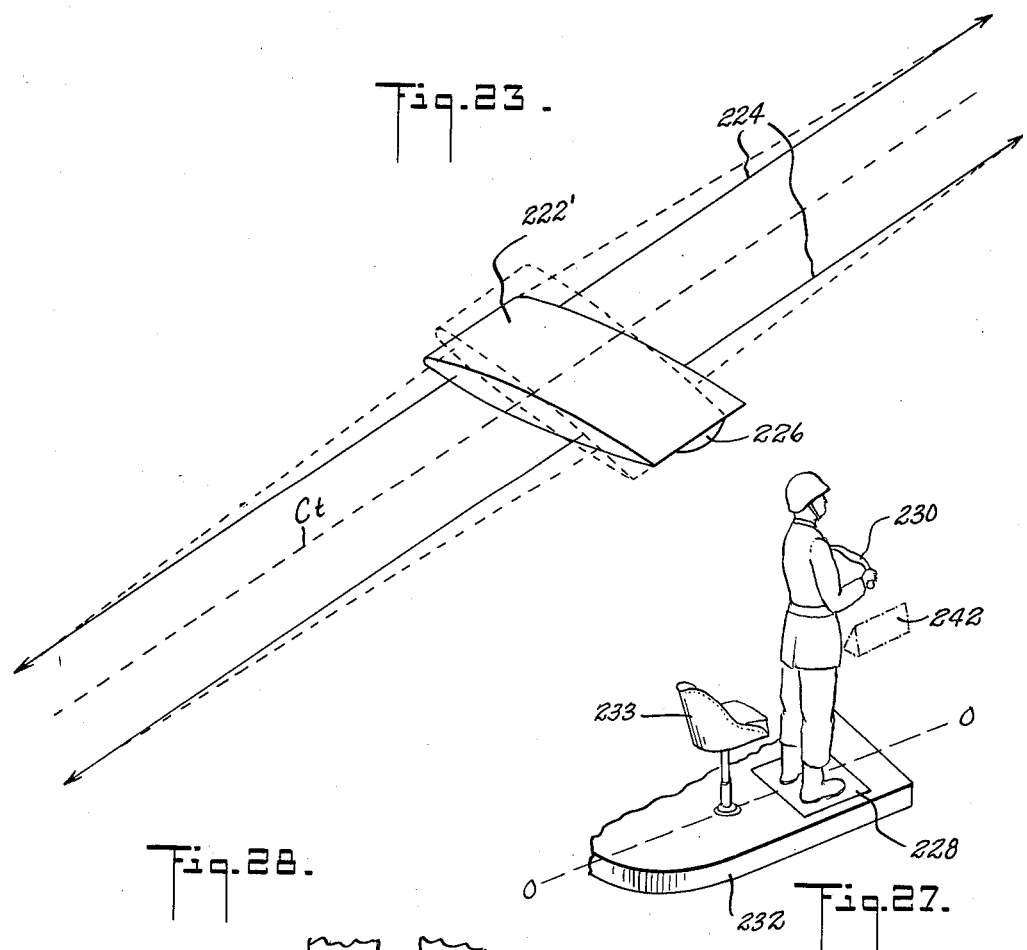
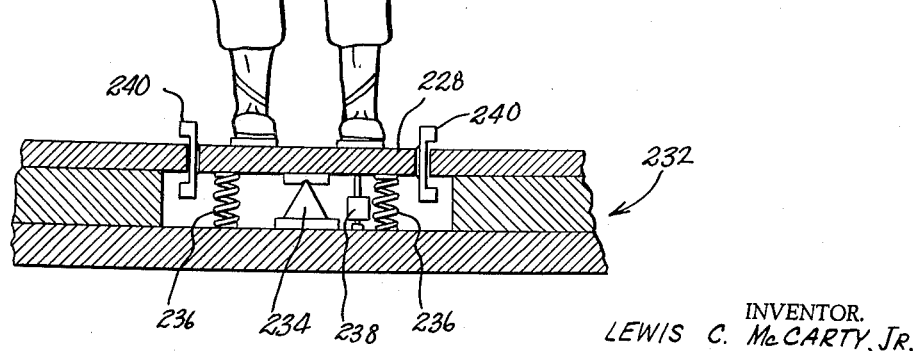
INVENTOR.
LEWIS C. McCARTY, Jr.
BY Kenyon & Kenyon
ATTORNEYS Nov. 27, 1962 L. C. McCARTY, JR 3,065,799
ROTARY WING AIRCRAFT
Filed April 21, 1958 16 Sheets-Sheet 12
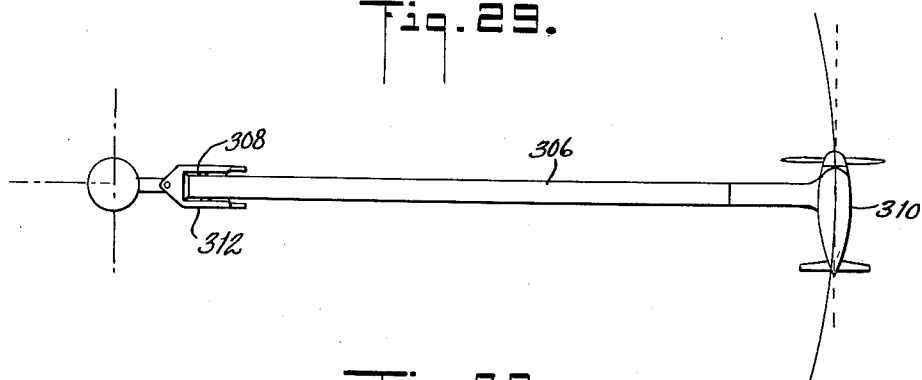
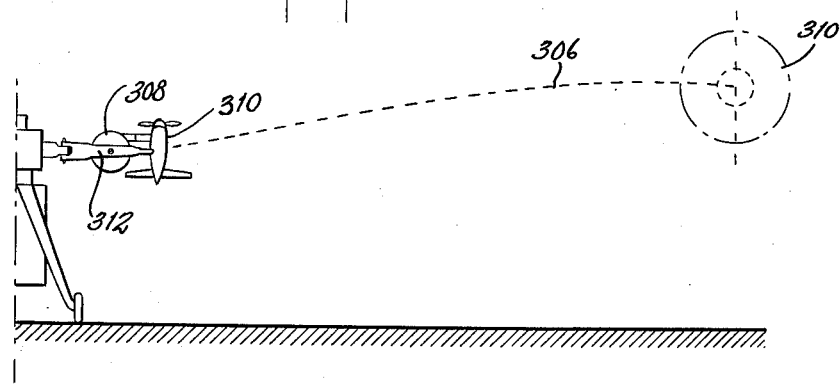
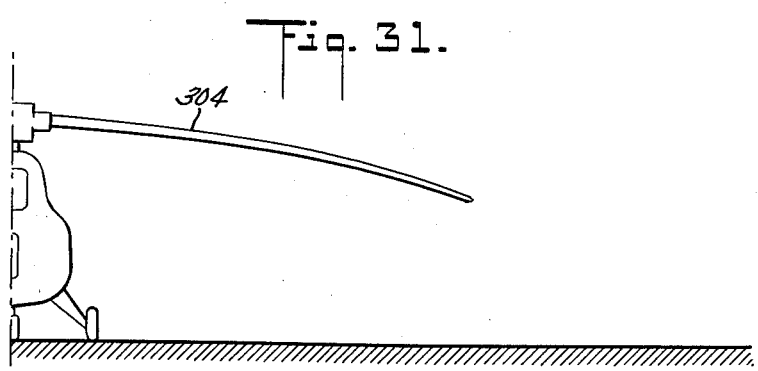
INVENTOR.
LEWIS C. McCARTY, JR.
BY Kenyon & Kenyon
ATTORNEYS Nov. 27, 1962  L. C. McCARTY, JR  3,065,799
ROTARY WING AIRCRAFT
Filed April 21, 1958  16 Sheets-Sheet 13
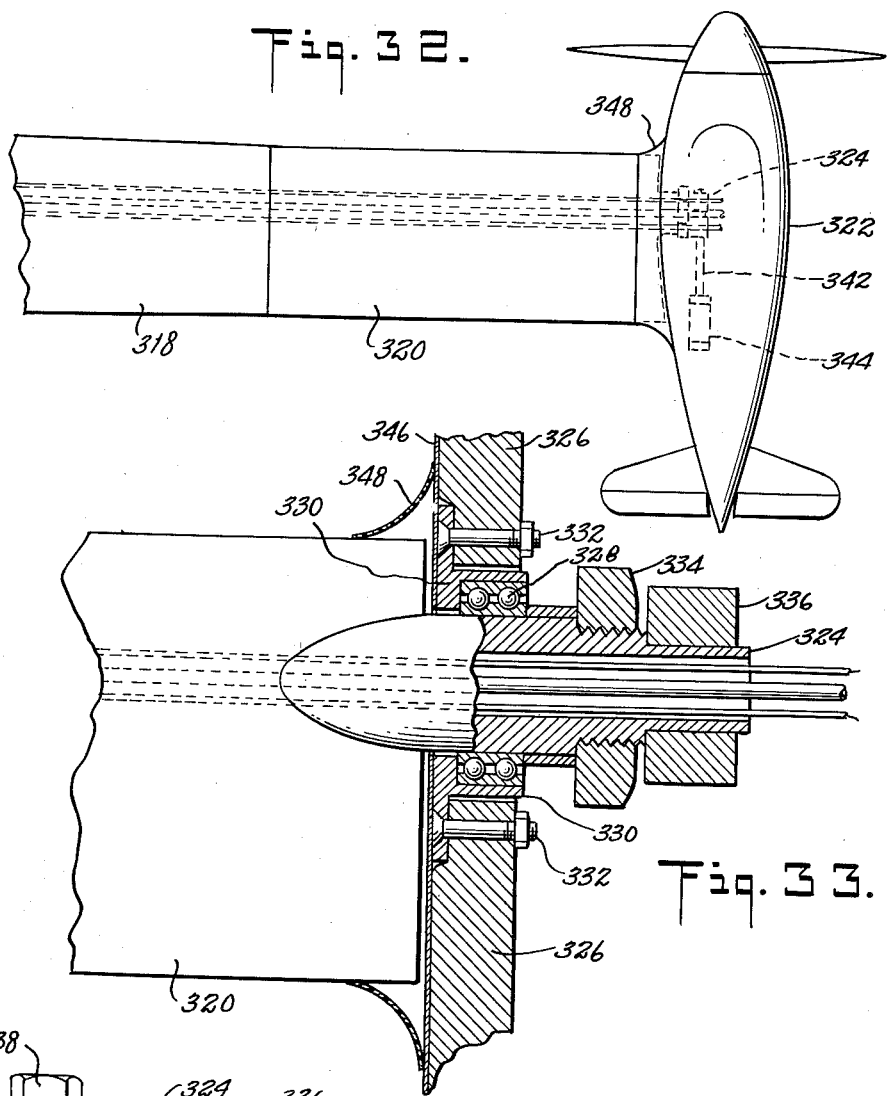
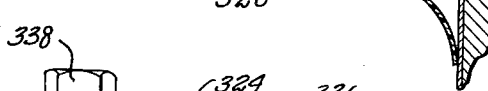
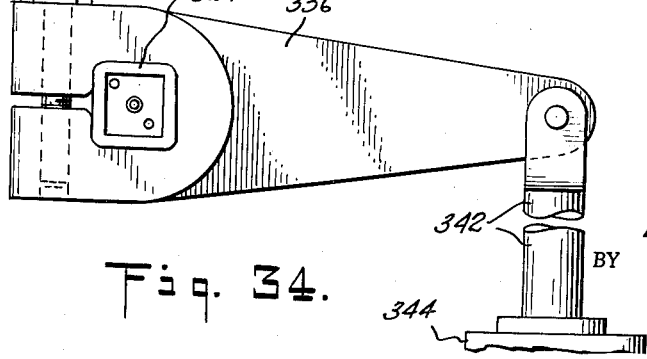
INVENTOR.
LEWIS C. McCARTY, Jr.
BY
Kenyon & Kenyon
ATTORNEYS Nov. 27, 1962
L. C. McCARTY, JR
3,065,799
ROTARY WING AIRCRAFT
Filed April 21, 1958
16 Sheets-Sheet 14
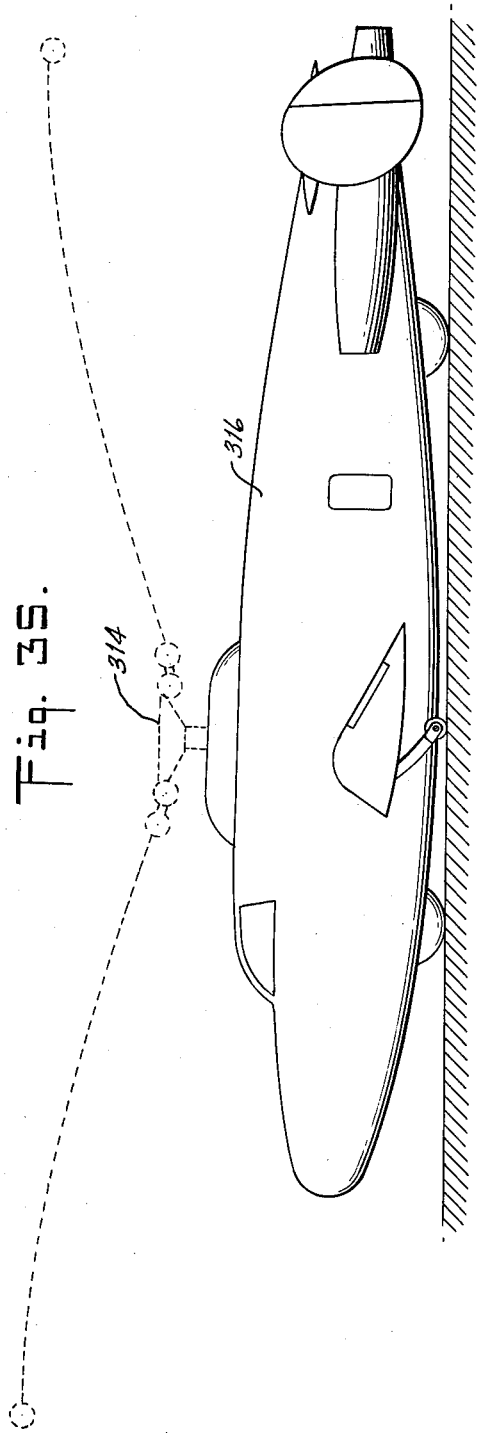
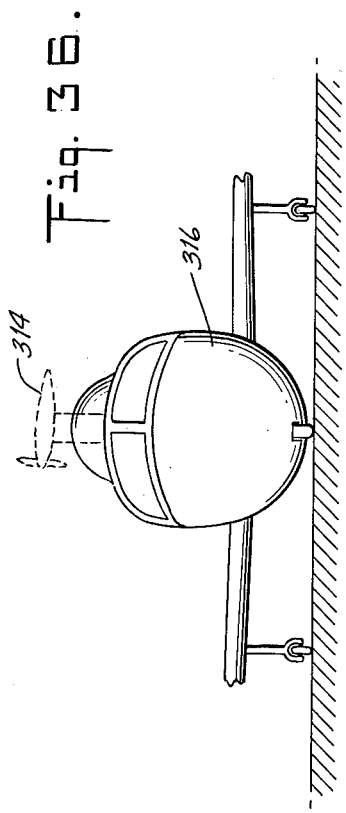
INVENTOR.
LEWIS C. McCARTY, JR.
BY Kenyon & Kenyon
ATTORNEYS

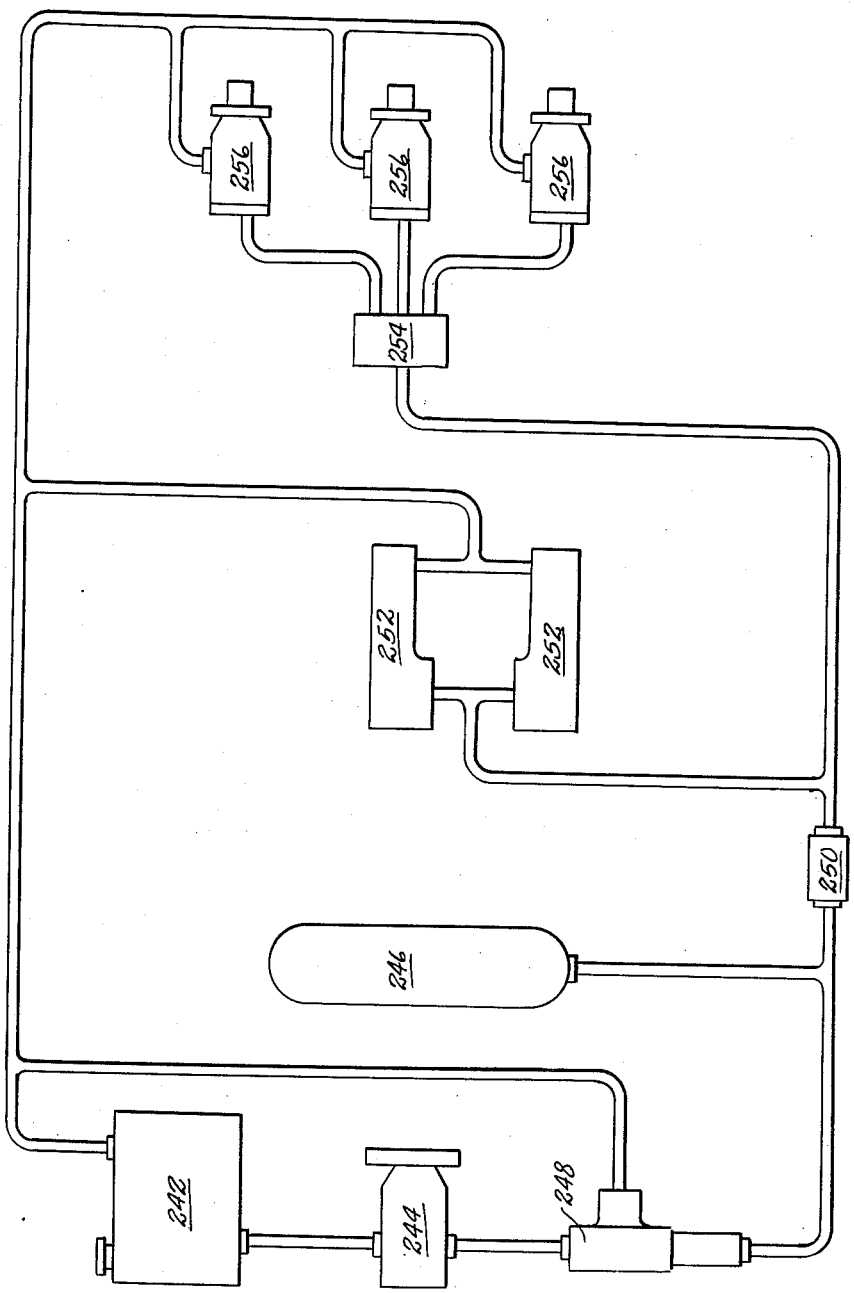

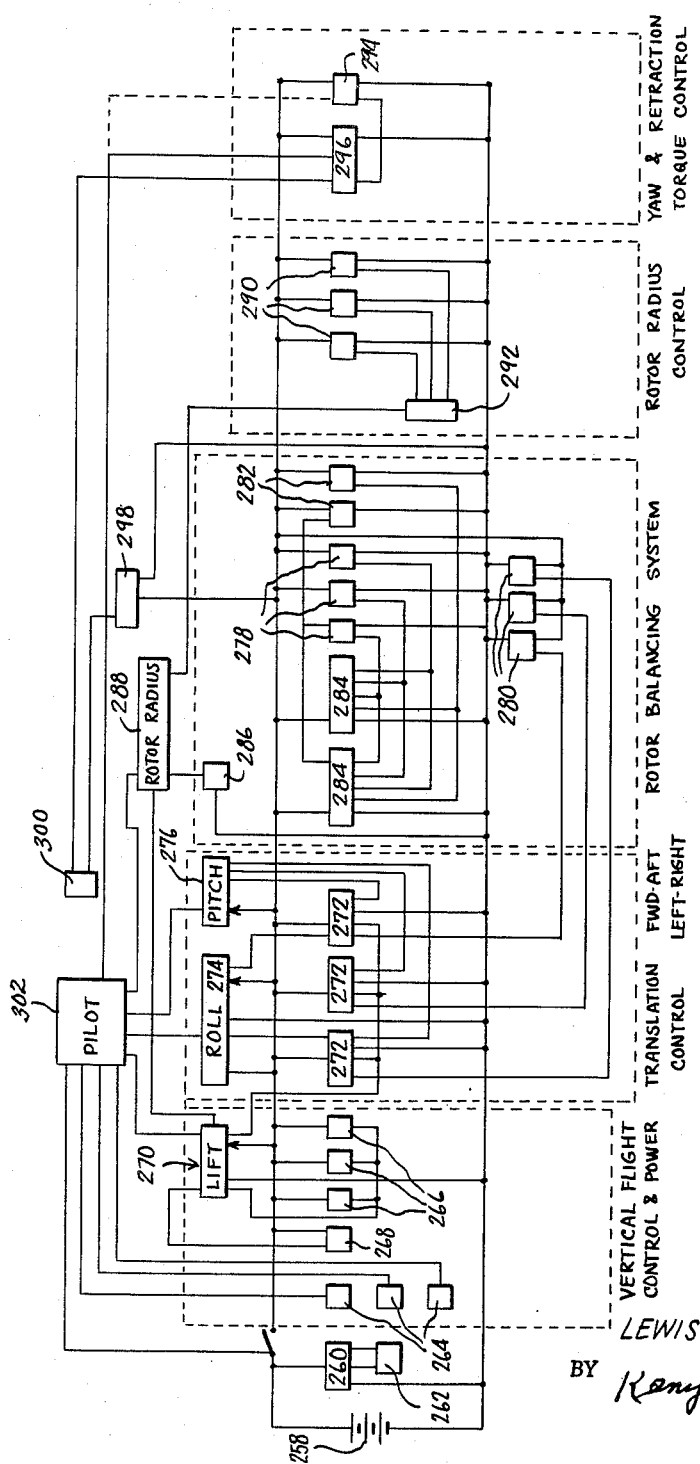

3,065,799
ROTARY WING AIRCRAFT
Lewis C. McCarty, Jr., Baltimore, Md., assignor of one-eighth to Brackley Shaw, Washington, D.C.
Filed Apr. 21, 1958, Ser. No. 729,569
42 Claims. (Cl. 170—160.11)

The present invention relates to rotary wing aircraft and more particularly to a rotary wing aircraft having rotor blades, possessing structural characteristics enabling the blades to be wound onto and off of a reel, which have propulsion units mounted on the tip portion thereof.

To adapt conventional rotary wing aircraft to lift and transport large loads, it is desirable to resort to rotor blades of extremely large dimensions. There is a practical limit on the dimensions of rotor blades, of conventional design, imposed by the structure necessary to make large blades self-supporting, statically and dynamically. Rotor blades having large dimensions, hence increased weight, require an increase in the airframe supporting structure, as well as greatly increased power. The ever-increasing weight of rotor blades, airframe structure and power units has resulted in a very poor operating efficiency, as well as, increased maintenance costs and logistical support required.

Large rotor blades of conventional design have been found to have basic functional limitations. It is well known that profile drag is one of the greatest losses in any rotary wing system. To increase the profile area, i.e. blade surface, of a rotor blade for structural reasons is to increase the profile drag loss. Further there is the problem of providing sufficient rigidity in the blade so as to provide for effective pitch control of the blades from the hub. Since the area of the blade wherein the maximum lift is available, i.e. near the tip portion thereof, is the farthest from the hub, it is difficult to stiffen the conventional blade sufficiently to provide adequate pitch control in the region of the blade tip.

Directly related to these problems is that of static droop and high inertial loads placed on the blades when starting up the rotor blades. If the blade is of substantial length there will be appreciable static droop due to the weight of the blades. For large radius rotor blades the problem is a major one. To combat it the rotor system must be placed high enough so that there is sufficient ground clearance. This, of course, makes it necessary to increase the dimensions and weight of the supporting structure, hence substantially increasing the weight of the entire aircraft. Further, with large blades their inertia is so great as to require hinge members sufficiently massive and strong to withstand the great starting loads to which they are subjected, particularly if there is any wind at the time.

Another problem that arises with helicopters of conventional design is the difficulty of training operators to fly such aircraft due to the complexity of controls that are used.

With these and other problems in mind this invention has the following objects and features:

One of the principal objects of this invention is to provide a more economical and efficient rotary wing construction.

A further object is to provide a light weight compact rotor system that is capable of being mounted in conventional aircraft for use when vertical take off is desired and which is capable of being retracted when not in use.

A further object is to provide a rotary wing aircraft having a greatly reduced empty weight as compared with conventional helicopters and flying cranes.

A further object is to provide a rotary wing aircraft wherein the rotor disc area may be varied in order to adapt the craft for varying conditions of flight, loading, landing and take off.

A further object is to provide the advantages of increased safety of operation in the event of power failure of one or more engines through the use of a simplified multi-engine system.

A further object is to provide a rotary wing aircraft with improved safeguards and which can be flown by operators having little or no previous flying experience.

A further object is to provide a rotary wing construction which has a rate of descent in vertical auto-rotation compatible with normal landing gear structural requirements and which includes the capability of safe entry to auto-rotation, following power failure of all main engines at any point in the operating zone usually fatal for a conventional helicopter.

A further object is to provide for a substantial reduction in initial cost by employing a multiplicity of small power plants of low unit cost, compared to the total cost of the power plant of a conventional helicopter capable of carrying an equal pay load for an equal distance.

A still further object is to provide a reduction in the logistic and supporting costs over that of a conventional rotary wing aircraft by having a power plant installation which consumes less fuel than a conventional helicopter of the same capability, as well as less airframe structure, reduced hanger space requirements and improved fatigue characteristics.

A further object is to provide a rotor blade having an air foil cross-section which is statically non-selfsupporting and is capable of providing lift forces and pitch control while being dynamically selfsupporting due to centrifugal forces in flight and which may be wound onto and off of a storage reel.

A further object is to provide a rotary wing aircraft wherein a sufficiently large proportion of the weight is placed at the tips of the rotor blades to produce high kinetic energy and inertia benefits for auto-rotative stability and transition and to improve flying qualities while eliminating problems of static droop and high flexural fatigue stresses.

A further object is to provide a light-weight compact rotary wing system having rotor blades which can be retracted when the power is throttled or idled and which can be extended when sufficient centrifugal and aerodynamic forces are developed to support the blade in a flying attitude.

The rotary wing aircraft and rotor system of this invention have features which provide means to lift and transport large pay loads economically. This rotor system is made up of a hub member, storage reels carried on the hub member and statically non-selfsupporting rotor blades and propulsion units mounted adjacent the tips of the blades.

The hub member is freely rotatable. The storage reels are attached to the hub and rotate therewith. The motor blades are flexible enough to be capable of being wound onto and off of the storage reels and have their root end connections thereto. Propulsion units are attached to the tip portions of the blades and may be provided with aerodynamic control surfaces to vary the effective pitch of the blades.

The rotor system described above may be supported in an aircraft which has the minimum of airframe structure. In addition the rotor system is extremely compact in that when the blades are stored on the reels the entire system occupies a relatively small area and volume.

The rotor blades of this invention are statically non-selfsupporting in that centrifugal force produced by the weight of the propulsion units, the tangential thrust provided thereby and the aerodynamic forces on the blades, are relied on to support them when in flight. The blades have an air-foil cross-section and are sufficiently inflexible in the chord-wise dimension to maintain their airfoil cross-section when extended from the storage reels. In adidtion, the rotor blades are adapted to transmit the centrifugal and lift forces produced in flight to the storage reels and hence to the hub member.

Dynamic control of the aircraft of this invention may be accomplished by twisting or warping the blades by variable control surfaces carried by the propulsion units, by control tabs on the blades themselves, by varying the angle of incidence of the tips of the blade with respect to the propulsion units, or a combination of two or more of these. The blades are designed so as to take the maximum advantage of the thin air-foil theory and may be made of length sufficient to reduce rotor disc loadings to less than have been available heretofore.

The reels are provided with means to permit extension and retraction of the rotor blades. The same means may be used to control the effective radius of the rotor blades to adapt the aircraft for varying conditions of flight, loading, available landing space and obstacles.

Further objects and features may be inferred from the description which follows when taken in connection with the accompanying drawings in which:

FIGURE 5 is a vertical cross-section taken on a plane facing the axis of rotation of the reel of this invention;

FIGURE 6 is a section showing the blade radius control of the reel shown in FIGURE 5;

FIGURE 7 is a cross-sectional-elevation view of the reel;

FIGURE 8 shows an alternate means for maintaining reel alignment with the blade during accelerated lead and lag motions;

FIGURE 9 shows a modification of the system illustrated in FIGURE 8;

FIGURE 10 is a detailed view taken on the lines 10—10 of FIGURE 9;

FIGURE 11 is an elevation view of the load attaching devices of this invention;

FIGURE 14 is a cross-sectional view in perspective showing the cross-section of one form of the flexible blade of this invention;

FIGURE 15 is a fragmentary cross-sectional view of the reel detail showing two layers of the flexible blade on the hub of the reel;

FIGURE 16 is a cross-sectional view of a blade illustrating one of the principles of this invention;

FIGURE 17 is a view similar to FIGURE 16 wherein an intermediate tab control is positioned on the trailing edge of the blade section;

FIGURE 18 is a cross-sectional view in perspective showing the location of control tabs on the flexible blade of this invention;

FIGURE 19 is a view similar to FIGURE 14 wherein the flexible blade has control tabs positioned on the rear edge thereof, illustrating certain centers and axes of the blades;

FIGURE 23 is a diagram illustrating the manner in which a multiple or double filament unit acts to provide a pitch angle change or stabilization of the blade at an intermediate point;

FIGURE 24 is a side view showing the attachment of the flexible blade to the winglike member on the engine nacelle;

FIGURE 25 is a top view of the engine nacelle and control surface at the tip of the blade;

FIGURE 26 is a side view of the engine nacelle and control surfaces showing the provision for a positive angle of attack when the craft is at rest;

FIGURE 27 is a partial perspective view showing the controls necessary for the operator of the aircraft of this invention;

FIGURE 28 is a cross-sectional view of the tilting platform control system of this invention;

FIGURE 29 is a schematic top view of one blade of the aircraft of this invention at an extended position;

FIGURE 30 is an elevation view showing the at-rest position of the propulsion unit and in dotted lines showing the propulsion unit at an extended position;

FIGURE 31 is a view similar to FIG. 30 showing the static droop of a conventional helicopter blade;

FIGURE 32 is a plan view of an alternate construction showing means for controlling the pitch by rotating the connecting portion of the blade at the nacelle;

FIGURE 33 is a cross-sectional plan view showing details of the pitch control devices of FIGURE 32;

FIGURE 34 is an end view of the pitch control actuating means shown in FIGURES 32 and 33.

FIGURE 35 is a side view of a composite aircraft having a variable radius rotary wing system in accordance with the teachings of this invention;

FIGURE 36 is a front view of the composite craft illustrated in FIGURE 35;

FIGURE 37 is a block diagram showing the hydraulic control system of the aircraft of this invention; and FIGURE 38 is a schematic wiring and block diagram showing the electrical control system of this invention.

Figure 1:
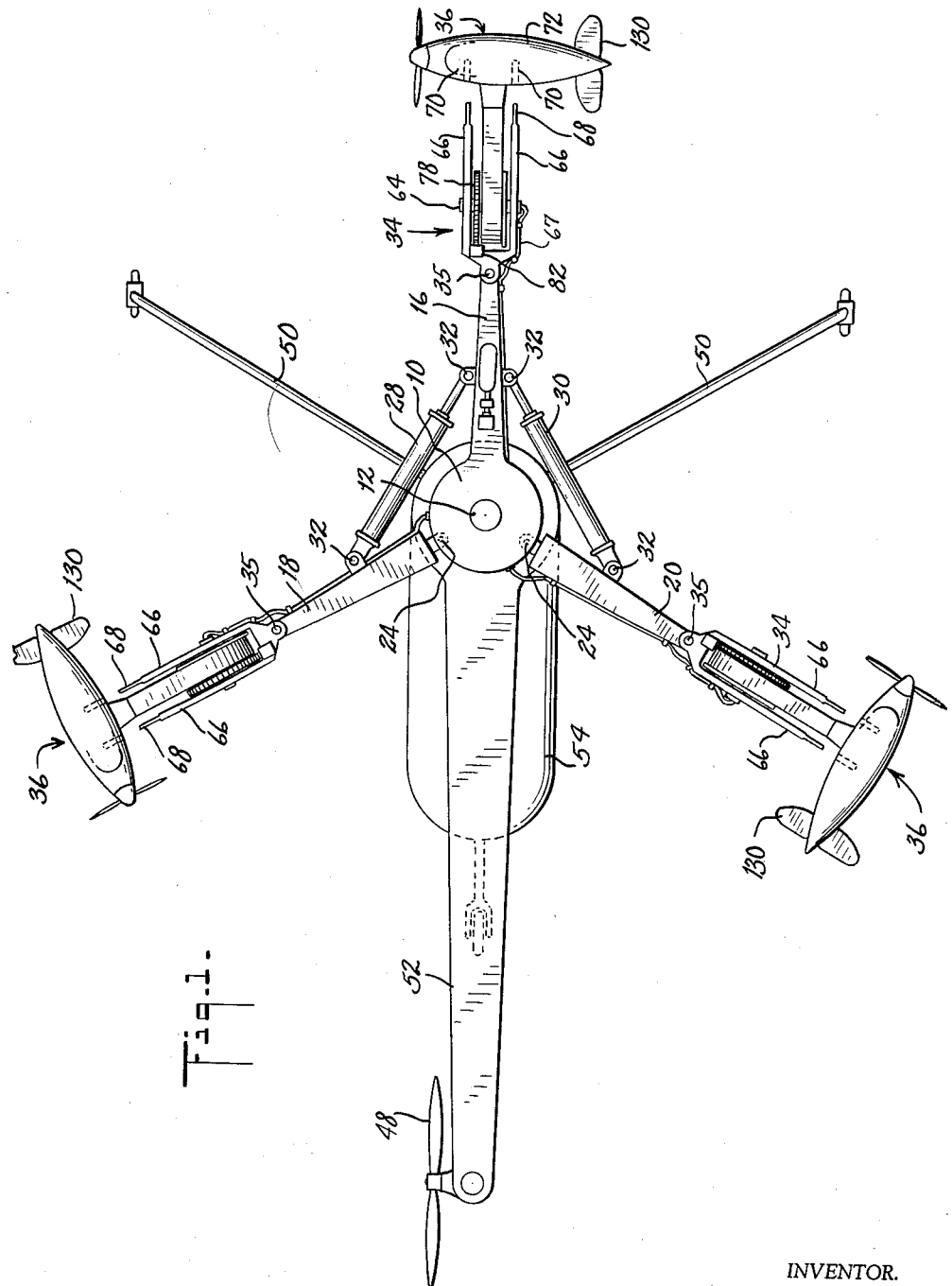
FIGURE 1 is a plan view of a rotary wing aircraft embodying the principles of this invention.

In order to facilitate the discussion of the novel aircraft and rotary wing system of this invention, embodiments of aircraft employing the principles of this invention will be discussed first. Next the rotor blade of this invention will be discussed, followed by a discussion of controls for the rotary wing aircraft of this invention.

Referring now to FIGURES 1, 2, 3 and 4 which illustrate embodiments of this invention in aircraft which are capable of performing a function similar to that of a large helicopter, in the particular embodiments illustrated, a three-bladed rotor system is employed. It will be appreciated that the number of rotor blades may be varied depending upon the purpose for which the aircraft is to be used and the degree of multiple engine security which is desired.

In the illustrated embodiment a rotary hub member 10 is supported on a pylon or fixed shaft 12 and journaled thereon so that the hub member 10 may rotate freely about the shaft 12 by means of bearing assemblies 14. The shaft 12 is fixedly mounted on the fuselage of the rotary wing aircraft, in its simplest form comprising the landing gear, operator's space, tail rotor boom, etc. as described below. The hub member 10 comprises one fixed arm portion 16 and hinged arm portions 18, 20. The arm portions 16, 18 and 20 may serve as fuel tanks, as will be more fully discussed below, and may also serve as or contain hydraulic accumulators. Arm portions 18, 20 are hinged to the central cylindrical portion 22 of the hub member 10 by means of hinges 24, 26. Lag actuators 28, 30 interconnect the arms 16, 18 and 16, 20 respectively, and are hinged to each of the respective arms by means of hinges 32.

The storage reel assemblies 34 are hinged to the outer ends of the arms 16, 18 and 20 by means of hinges 35. The reel assemblies 34 provide supports for flexible blade and propulsion unit assemblies 36. The reel assemblies 34 and the flexible blade and propulsion unit assemblies 36 will be more fully discussed below.

In addition to the reel assemblies 34, the fixed arm 16 has mounted thereon (see FIG. 4) a hydraulic accumulator 38, a pressure regulator 40, and a flow divider 42, all of which form portions of the hydraulic control system of the illustrated aircraft and will be fully discussed below.

Attached to the lower portion of the hub member 10 is tail rotor drive pulley 44. A Gilmer belt 46 mounted on the pulley 44 provides a connection for transmitting rotative power to an anti-torque means, in this case a tail rotor assembly 48. It will be appreciated that other means may be employed to drive the tail rotor assembly 48 than that shown, such as an auxiliary engine. Also, other anti-torque means may be employed such as a variable rudder or jet exhaust. The tail rotor assembly 48 and its function will be more fully discussed below in connection with the operation of the aircraft.

Figure 3:
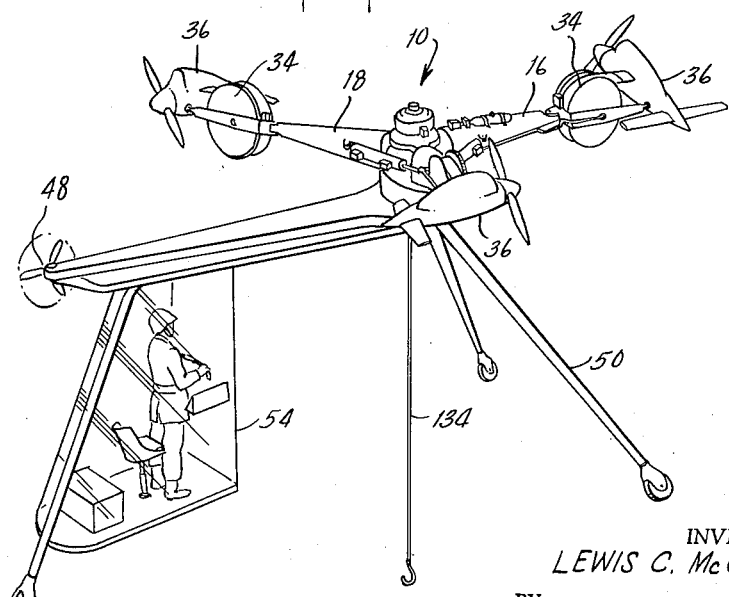
FIGURE 3 is a perspective view of another embodiment of the rotary wing aircraft of this invention.

The pylon or fixed shaft 12 provides supporting means for and is fixedly attached to the landing gear 50, the tail rotor boom 52 on which the anti-torque assembly 48 is mounted, and the operator's space or cage 54. In this embodiment, the operator's space 54 is shown as directly beneath and extending rearwardly toward the anti-torque assembly 48. However, in certain instances, for the purpose of providing an opportunity for better depth perception, the operator's space 54 may be moved substantially further toward the rear of the rotor boom 52 as shown in FIGURE 3.

To provide for the electric power and hydraulic pressure requirements of the illustrated aircraft, an electric generator and slipring assembly 56, a hydraulic fluid reservoir 58 and a hydraulic pump 60 are provided near the top portion of the hub assembly 10 and the shaft 12. It will be appreciated that portions of the generator and slipring assembly 56 and the hydraulic pump 60 are attached to the fixed shaft 12 and other portions are attached to the rotary hub member 10 as is customary in the art for actuating the generator and the pump. Electrical connections from the electric generator and slipring assembly 56 extend to the various electrical controls (fully discussed below) and are not shown herein with the exception of auxiliary electrical cables 62 shown as leading out of the hollow portion of shaft 12 near the lower end thereof for supplying electric current and control lines to the equipment mounted on the tail rotor boom 52, including the operator's space. In addition, it should be appreciated that hydraulic connecting means are provided between the hydraulic pump 60 and the various components of the hydraulic control system of this invention.

Each of the reel assemblies 34 is rotatively mounted on shoulders 64 which are journaled on reel supporting arms 66. The shoudlers 64 may be hollow in order to provide for the access of fuel and electrical cables 67 to the hollow interior of reel assembly 34 through rotary fuel seals and slipring assemblies 109. The rotary fuel seals and slipring assemblies at 109 may be of the usual type available commercially or the fuel hose and electrical cables may be of the flexible and distortable type, in which case they need only be supported at the point where they pass through the opening in shoulders 64, so that a few coils of tubing and cable will accommodate the moderate twisting involved in the few rotations of the reel.

The reel support arms 66 extend outwardly beyond the shoulders 64 and have extended fingers 68 which are adapted to fit into locating openings 70 in the nacelles 72. The purpose of the fingers 68 and the locating openings 70 is to provide a means for supporting the nacelle 72 when the rotor blade 74 is in the fully retracted position.

Figure 4:
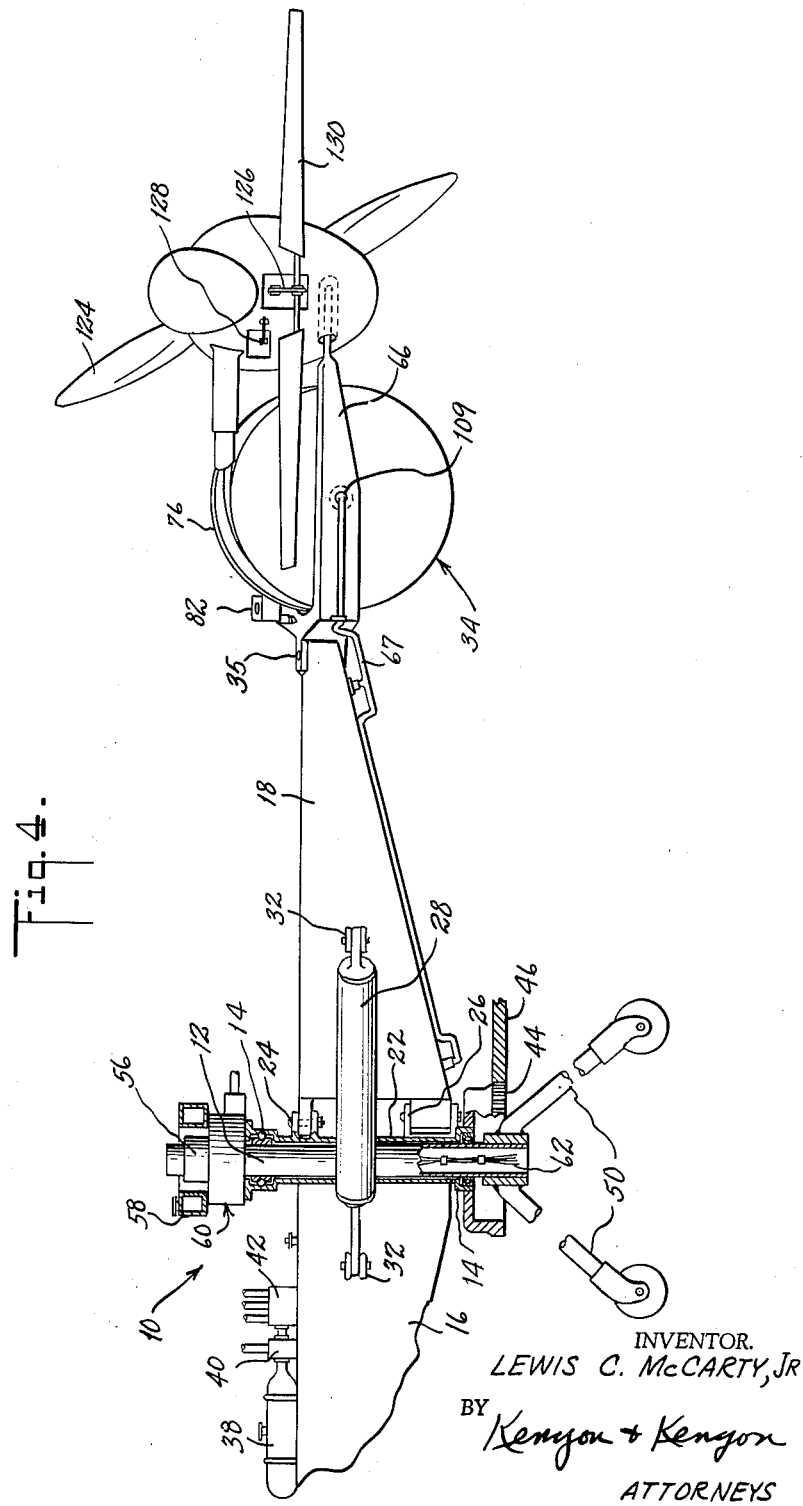
FIGURE 4 is a partial rear end view illustrating the hub, reel and propulsion unit system of the embodiment illustrated in FIGURE 1.

Referring now to FIGURES 5 and 6, as well as FIGURES 1 and 4, it will be seen that the reel 76 has a worm gear wheel portion 78 on the periphery of one of the flanges 80 thereof. A radius control actuator 82 is provided on the reel assembly 34 and includes a worm 84, which controls the rotation of the reel 76. The radius control actuator 82, as shown, is actuated by hydraulic fluid and receives hydraulic fluid under pressure from the flow divider 42. The operation of this system will be more fully discussed below in connection with the discussion of the operation of the aircraft. However, it may be stated generally that it is preferred that the actuators 82 of each reel assembly operates at the same speed when subjected to the same force or provided with the same power so that the three blades will be extended and retracted simultaneously.

Referring now to FIGURES 5 and 7, it will be seen that shoulders 64 of reel 76 are journaled to the reel supporting arms 66 by means of bearing assemblies 86 secured in place by nuts 65. The flange 88 may be provided with a double grooved guide 90 positioned on the outside face thereof for supporting electric cables 92 and a fuel line 94. The cables and fuel lines wound on the open portions of the guide member 90 are led into the hollow interior of the reel 76 through openings in the flange 88. This is another alternate construction to that shown in FIGURE 4, which eliminates the need for rotary fuel seals and slipring assembles 109. Spring members 95 may be used to keep the fuel line 94 and electrical cable 92 taut in their respective grooves on the guide member 90. The portion of electric cables 92 and the fuel line 94 within the interior of the reel member 76 are attached to a fuel connecting member 96 and electrical conductors 98 which in turn are connected to a fuel line 100 and electrical conductors 102 within the root portion of the rotor blade 74. In these views the flexible blade 74 is shown in approximately its maximum extended position.

The reel member 76 has a hub portion or barrel 104 which has an exterior surface corresponding to the cambered shape of the flexible blade 74. The hub portion 104 has a terminal portion 106 to which is attached terminal block 108 and metal filler plug 110 by means of a bolt 112 and the fuel connector bolt 96 which has an internally drilled passage 111 to accommodate the passage of fuel from the fuel line 94 to the fuel line 100 in the blade 74. The end of the rotor blade 74 is attached to the terminal block 108 in which the fuel connectors 96 and the electrical connectors 98 are enclosed. The terminal block 108 is preferably made of a plastic material having high dielectric characteristics of the type normally used for similar purposes and is totally enclosed so that its structural strength is dependent upon its bulk retention characteristics. The electrical leads 102 may also serve as tension filaments for the rotor blade 74 or preferably additional separate electrical conductors may be molded into the blade. The electrical leads 102 are soldered to the connectors 98, sufficient leads being used to transmit and carry out all the control commands to the engine nacelle 72 and control tabs on the blade, if electrically controlled. Where separate tension filaments are used additional connecting means will be provided to the block 108 in order to connect the tension filaments with the terminal block 108 to transmit the centrifugal forces to the hub 104 of the reel member 76.

In FIGURE 7, a flapping sensor assembly 114 is shown. This assembly comprises a supporting arm 116 pivotally mounted on the center portion of the reel support arms 66, to which is attached a wheel like member 118. An auxiliary roller 120 carried by arm 122 is provided, the latter being hingedly connected to supporting arm 116.

The wheel number 118 has a peripheral portion which has a shape corresponding to the shape of the top portion of the rotor blade 74. The purpose of the flapping sensor assembly 114 is to provide a means to determine the flapping condition of the blade 74 and may additionally provide for an appropriate reel-in alignment by clamping the rotor blade 74 against the hub 104, by incorporating a flange extending over the leading edge of the blade on wheel 118. The purpose of roller 120 and its attachment to the supporting arm 116 is to improve the operation of the flapping sensors 114. Roller 120 may also serve as a lag sensor by forming a flange on one end thereof, extending over the leading edge of the blade, the roller sliding on its supporting shaft to indicate the extent of the lag in the blade. The details of operation and functioning of the flapping sensor 114 will be more fully discussed in connection with the discussion of controls of this aircraft below.

Referring now to FIGURE 8, alternate means are illustrated to insure proper reel-in alignment of the blade during accelerated lead and lag motions. In place of the flapping sensor 144 of FIGURE 7, a sprocket 174 is rotatably mounted on a sprocket arm 176 which is in turn pivotally mounted at 64' on the reel support arm 66'. A spring pressed damper member 178 between the support arm 66' and the sprocket arm 176 holds the sprocket in contact with the blade and aids in absorbing transient forces. The member 178 may also be used as a sensitive means to detect flapping movements of the blade 180.

The sprocket 174 aids in reel-in alignment of the blade 180. Sprocket 174 has teeth 182 projecting therefrom. In order to accommodate the teeth 182, the blade 180 is provided with serrations (not shown) on the underside thereof into which the teeth 182 are projected. The serrations of the blade 180 must be well back along the chord so as not to interfere with the aerodynamic characteristics of the blade.

A further alternate construction of a flapping sensor 184 is shown in FIGURES 9 and 10. In this embodiment a grooved roller 186 is adapted to bear on the leading edge 188 of a blade 190 and to be moved upwardly and downwardly by movement of the blade. The axis of the reel member 76" is skewed slightly to insure that the leading edge 188 will always contact the groove in the roller 186. Thus, lag forces are transmitted through the arm 192 to the reel support arm 66" and hence to the lag hinge 35. In this embodiment, the leading edge 188 must be sufficiently strong so as to withstand the continual contact with the roller 186. Reel-in alignment is effectively assured by this means.

It will be appreciated that in addition to determining the flapping condition of the blade, the flapping sensor means described above may also be adapted easily to provide a measure of the lead or lag of the blade.

In order to provide for an effective angle of attack, each reel assembly 34 is hinged to the arms 16, 18 and 20 so that the axis of rotation of the reel member 76 would make an angle of between 20 to 35° with a plane normal to the axis of shaft 12. In this manner, each rotor blade 74 will be provided with an effective basic angle of attack at all times, including the beginning of the extension phase of operation.

The engine nacelles 72 may be provided with aircraft engines of a standard type which drive a propeller 124. Fuel from the fuel supply tanks is transmitted to the engines through fuel lines 100 in each of the rotor blades 74. Control commands are transmitted to the control surface actuator 126 and the engine throttle actuator 128 and other components within the engine through the electrical leads 102. Some of the leads 102 are used to transmit information relating to engine speed, oil temperature and the like back to a control panel in the operator's space 54.

In order to operate the aircraft illustrated in FIGURES 1 through 5, the operator starts the engines in the nacelles 72 by means of the conventional ignition system, shown in the electrical wiring and block diagram of FIGURE 38. At this time, the control surfaces 130 will normally be at a flat pitch phase so that the blades do not have a sufficient angle of attack to tend to lift the aircraft from the ground. Then, by means of the conventional type of throttle control, all engines are made to run at the same speed. Since the hub member 10 is freely rotatable on the shaft 12, the hub member 10 begins to rotate due to the thrust of the propellers 124. As the hub member 10 picks up speed, the engine nacelles 72 are maintained at the inboard or at rest position until sufficient centrifugal force is developed to overcome a predetermined retraction force exerted by the radius control actuator 82. Once sufficient centrifugal force has been developed, it will pull the engine nacelles 72 and rotor blades 74 from the reel supporting arms 66 to an extended position. As the nacelles 72 and rotor blades 74 move out from the reel assemblies 34 the rotor blades 74 are unwound from the reel members 76, it being understood the rotating hub and reels are at a sufficient height above the tail rotor boom 52 and anti-torque assembly 48 to avoid interference to the rotation of said blades as they are being extended or as rotated thereafter. The operator may at all times control the radius to which the rotor blades 74 are extended by means of controls described below which operate the radius control actuators 82. Once the desired radius has been achieved, the operator then increases the speed of the engines until he reaches the desired speed of rotation of the rotor system. After having achieved the proper speed he may then lift the aircraft off the ground by controlling the control surfaces 130 by means of control surface actuators 126. The takeoff may occur gradually or a "jump takeoff" may be accomplished. The latter requires over-speeding the rotor blades in flat pitch and suddenly increasing the pitch to the maximum.

Control of movement in horizontal flight is achieved by controlling the pitch of the blades 74. Cyclic and collective pitch of the blades 74 is controlled in the customary manner and is achieved by twisting each of the rotor blades 74 about its torsional axis by varying the position of the control surfaces 130. The control surface actuators 126 are given automatic commands from the control system described below in order to achieve the cyclic and collective pitch. Control of movement in horizontal flight is in accordance with customary principles in the helicopter art.

When the power is throttled or idled while the aircraft is on the ground, the centrifugal force produced by the rotating mass will at some point be less than the predetermined retracting forces exerted by the radius control actuators 82. As the speed decreases the blades 74 will be retracted and wound on the reel members 76 until the nacelles 72 reach the at-rest position when each will be supported by the finger portions 68 entering locating openings 70. Accurate reel-in alignment is provided by the reel members 76, the flapping sensor assemblies 114 or 184 or sprocket 174, or a combination of these devices.

Under normal flying conditions the torque which must be counteracted by the tail rotor 48, or other device, is small. However, due to conditions that may prevail in accelerated retraction phases or power off conditions, a substantial anti-torque force may be necessary. Controls, described below, are provided for varying the torque transmitted to the tail rotor assembly 78, and making possible azimuth control of the operator's space 54.

Reference is now made to FIGURE 11 wherein the lower portion of a shaft 12' has been adapted to carry a cargo suspension device 132. Thus a cargo or load may be attached by a cable 134 to the fixed portion of the aircraft illustrated in FIGURES 1, 2, 3 and 4. While any suitable means may be used, the one illustrated comprises a pelican hook 136, having a hinged jaw 138 which is held closed by a locking catch 140. A compression spring 142 holds the catch 140 in its closed position except when released by a cable control 144.

The cargo suspension means 132 is attached to the shaft 12' so that the point of attachment of the pendant cable 134 is as near to the center of plane of rotation of the hub 10' as possible in order to minimize any coupling of roll or pitch forces with the movements of a cargo or load attached to the cable 134.

Figure 12:
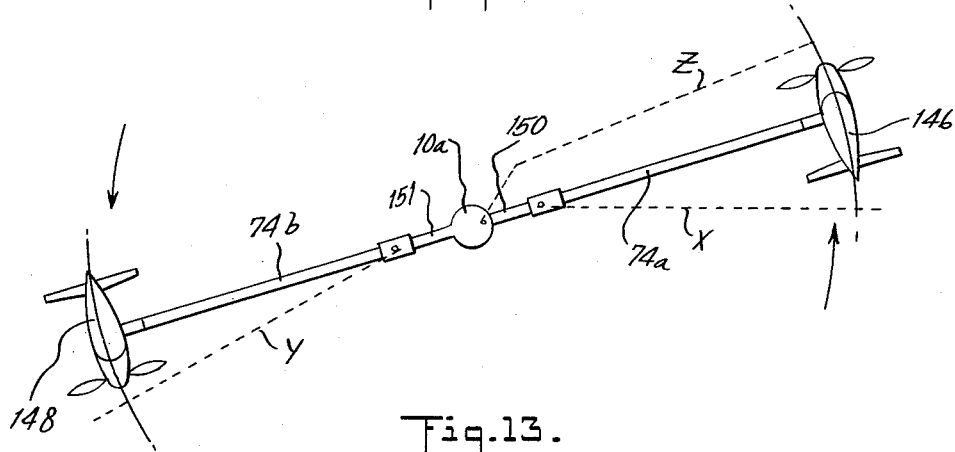
FIGURE 12 is a schematic view of a two-bladed embodiment of this invention.

One of the principal features of this invention is the provision of a multiple bladed rotor system in which the force system followed is balanced to effect a state of equilibrium. In order to meet the requirements of balance, it is essential that all forces in the plane of rotation center at the axis of rotation of the hub member 10. Referring now to FIGURE 12, where a schematic diagram of a two-bladed rotor system is shown, it may be seen that when two identical blades 74a, 74b, are used with propulsion units 146, 148 attached thereto and providing equal thrust, the centrifugal force vectors will pass through the center of the hub member 10a. When this occurs, the system is in balance. However, if for any reason the effective thrust of the propulsion unit 146 is less, such as an engine failure in that unit, blade 74a will lag so that its center line assumes a position in the direction of the dotted line X. Also, the tendency of the propulsion unit 148 and blade 74b is to advance to a position such as the line Y. In these positions, unbalancing moments are produced. Automatic throttle controls actuated by lag sensors may be provided to advance the throttle in the engine of unit 148 to offset the power loss from unit 146. In order to restore an equilibrium position of balance, the arm 150 to which the unit 146 is attached, must be moved to a position corresponding to the dotted line Z. The power unit (not shown) for accomplishing this movement may be a double acting hydraulic piston and cylinder power unit of the type indicated at 28 in FIGURE 1, connected between rigid projecting arm attached near the outer ends of arm sections 150 and 151. Fluid pressure for actuating the power unit may be supplied by the automatic lag sensors described herein, or manually, as preferred. As the power unit is contracted and the projecting arms are drawn toward one another, the arm section 150 is advanced with respect to arm section 151, thereby causing the nacelle 146 to be advanced to a position such that the lag of this unit is canceled. In the same way a lag of unit 148, as by power failure, can be corrected by extending the power unit, causing the arm 150 to be advanced with rsepect to arm 151, thus effectively advancing unit 148 and removing the lag of this unit.

Figure 13:
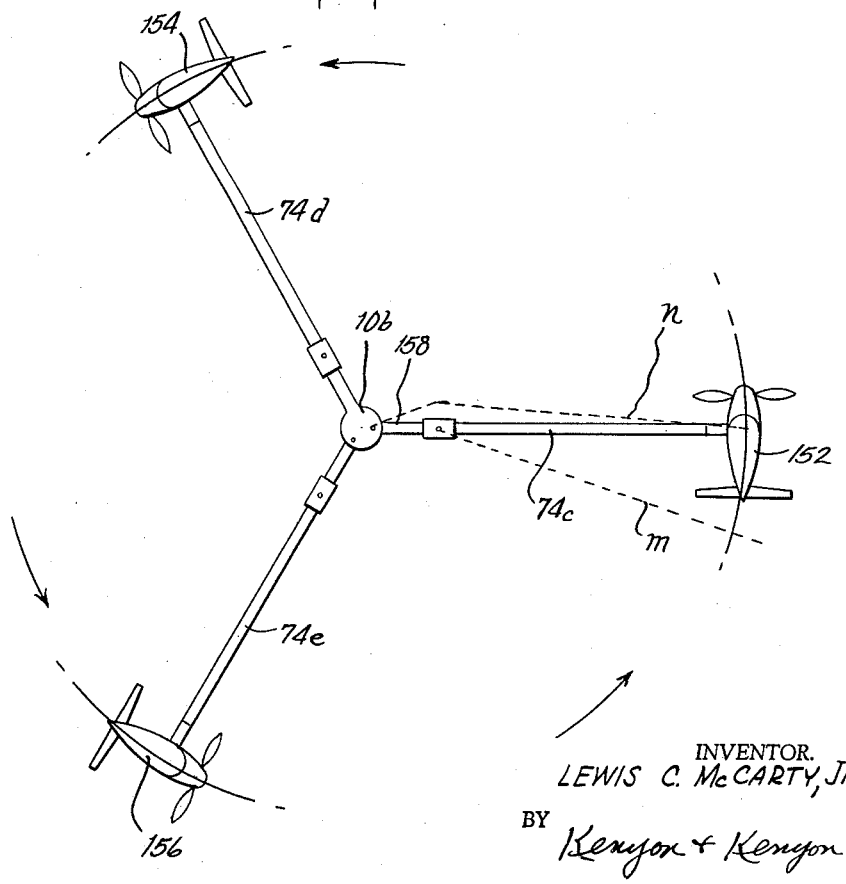
FIGURE 13 is a schematic view of a three-bladed embodiment of this invention.

In FIGURE 13, the same principles as discussed with respect to FIGURE 12 are applicable. In this case, if the propulsion unit 152 loses power, then there is a tendency for it to lag toward a position illustrated by the dotted line M. Under the influence of a lag actuator, shown in FIGS. 1 and 4 as hydraulic piston cylinder power units 28 and 30, the unbalance in forces will be curved when the blade 74c takes up a new position corresponding to the dotted line N. In this instance, since there remain two active propulsion units 154, 156, the advance necessary for the arm 153 will be substantially less than would be required in the two bladed model of FIGURE 12. The blade 74e could be retracted partially, or extended, as an additional means for compensating for such unbalance of forces.

It will be appreciated that the lag actuator and lag sensor system is designed so that conditions of balance will remain constant at all times. The lag sensors are adapted to detect differences in lag forces and control the lag actuators. Thus, a degree of multiple engine security and balance is automatically accomplished.

The rotor blade 74 when extended has a substantially uniform airfoil cross-sectional area and configuration to provide the effective lift forces necessary to lift the aircraft itself and any load off the ground. In order to provide for the retraction and extension of the blade 74 it must have enough flexibility in the span-wise dimension to permit it to be wound up on the hub 104 of the reel member 76 while being sufficiently inflexible in the chord-wise dimension to maintain its air foil shape when extended. In addition, the blade 74 must be capable of being twisted about its torsional axis of accommodate the necessary changes of collective or cyclic pitch. Further, the blade 74 must have sufficient strength in the direction of its longitudinal axis so as to be capable of transmitting the forces to the reel member 76, and thence to the hub member 10. Other features and design criteria are discussed below in connection with FIGURES 14 through 23.

A cross-sectional view of one form of the rotor blade 74 of this invention is illustrated in FIGURE 14. In the blade 74 there is provided an airfoil construction as shown. In keeping with thin airfoil theory, to provide the maximum lift co-efficient the thickness ($t$) of the airfoil may be of the order of 2% to 6% of the chord dimension ($c$). The leading portion ($b$) has a cambered shape extending back for about 50% to 60% of the chord dimension ($c$) and may be of substantially uniform thickness. The trailing portion ($d$) tapers gradually to the trailing edge 160. It will be noted that trailing portion ($d$) has a reverse cambered shape, being curved upwardly to provide an effective twisting counter force to the twisting force produced by the shape of the leading portion ($b$). The net result is to produce a constant moment coefficient of the blade 74 while maintaining the good aerodynamic performance characteristics provided by the forward portion ($b$). The radius of curvature ($R_1$) of the leading portion ($b$) is determined from thin airfoil theory.

The structural stiffness and disposition of the elements of the blade is such that the moment coefficient will remain substantially constant, no undesirable oscillations will be produced, and the contours as shown will remain substantially constant in flight when the blade 74 is extended outwardly from the reel member 76. It will be understood that the radius of curvature ($R_2$) may be substantially longer when the blade 74 is wound on the hub portion 104 in order to decrease the size of the stored blade and reel member 76. As shown in FIGURE 15, the shape of the hub 104 is such as to support the blade 74 in its proper cross-sectional shape, with the exception of the possible change in the radius of curvature from ($R_1$) to ($R_2$).

The shape of the hub 104 is important to insure proper reel-in alignment of the blade 74. It may be desirable to maintain the leading edge 162 spaced from the flange 80 to prevent damage to the leading edge 162. Even more important, however, is to insure that the trailing edge 160 does not contact the inside wall of the flange 88 because of the delicate nature of the trailing edge 160. The spacing between the trailing edge 160 and the flange 88 may be effectively accomplished by canting or skewing the axis of the reel member 76, causing the leading edge 162 to contact the flange member 80. Due to the reinforced construction of the leading edge 162, no risk of serious damage is presented.

The blade 74 may be made up of top covering layer 164 and bottom covering layer 166 of a suitable material, such as impregnated fiberglass, in which the principal glass fibers may be in the chordwise dimension to maintain the airfoil contour discussion above. Fillers 168, 169 are molded in between the layers 164, 166. The filler 168 may be of styrofoam or other foam plastic in the trailing portion ($d$) and a denser material 169, such as an epon-epoxy material, in the forward portion ($b$) to provide the strength and elasticity required to maintain the flexibility and airfoil characteristics described above.

The fillers 168 and 169 may also consist of compressible materials in order to provide more satisfactory conformity of the air foil section of the blade 74 to the hub 104, thereby facilitating reeling with minimum reel volume.

Filler 168 may consist of an elastomer or foam elastomer material having sufficient effective elastic modulus to expand to airfoil contour when extended from the reel 76. Filler 169 may consist of a denser material of the same general types.

Metal cables or tension filaments 170 are provided to resist the forces produced by the roating mass of the nacelle 72 and the mass of the blade 74. As described above, certain or all of the tension filaments 170 may also serve as electric conductors for carrying the electric power to the nacelle 72 for control commands and information returns. Alternately, the tension filaments 170 may serve only to resist the forces and a separate cable or cables may be used to conduct electrical power. Also, where de-icing may be a problem, one or more of the tension filaments 170 may serve as a resistance heating element to elevate the temperature in the forward portion ($b$) of the blade 74. The fuel line 109 is also positioned within the blade 74. Mass balancing weight elements 172 may be provided to produce a satisfactory center of gravity location along the chord.

Referring now to FIGURES 16, 17, and 18, the blade 74' is shown as set to provide the optimum angle of attack adjacent the inner anchored end of the blade. The angle of the outer end of the blade may be controlled by the elevators on the nacelle, the intermediate portions of the blade being determined by the twist in the blade.

In some instances, it may be desirable to provide control tabs 171 as shown in FIGURE 18 to trim the blade 74", at various points along the trailing edge of the blade to achieve optimum performance of the airfoil. Since the lift forces along the length of the blade 74" vary according to the distance from the center of rotation and the effective lift of different blades may vary, the control tabs 171 may be trimmed in advance to insure nearly ideal distribution of the lift forces along the length of the blade by varying the effective angle of attack at various points along the blade 74". Since the blade 74" is designed to be wound on the reel member 76 so that the trailing edge 160' never rests on the adjacent layer of the blade, fixed trimming will remain effective over a long period of use. Alternatively, tabs 171 may be controlled by the pilot or automatically to trim the blades 74" in the usual manner for aircraft.

FIGURE 19 shows an alternate construction of a flexible blade 194 similar to that shown in FIGURE 14. Control tabs 196 are provided extending out from the trailing edge 198 and function similarly to those shown in FIGURES 17 and 18 and discussed above. The tabs 196 may be fixed, be under the control of the pilot or operate automatically to obtain the optimum angle of attack along the length of the blade 194 to create lift conditions that approach the ideal.

As shown in FIGURE 19, the aerodynamic center $C_a$, the effective torsional axis $C_t$ and the center of gravity $C_g$ are all located at different points within the blade structure. The usual design criteria call for all three centers to be as nearly coincident as practical to minimize mass and elastic coupling. However, in the flexible blade of this invention, it is desirable to have the effective torsional axis $C_t$ forward of the aerodynamic center $C_a$. Further, it is preferable to provide a downward trimming moment at the control tabs 196 to produce a rotative equilibrium at the optimum blade angle of attack as described above. Another important element is the positioning of the center of gravity $C_g$ forward of the aerodynamic center $C_a$ to avoid unstable oscillations or flutter of the blade 194.

Figure 20:
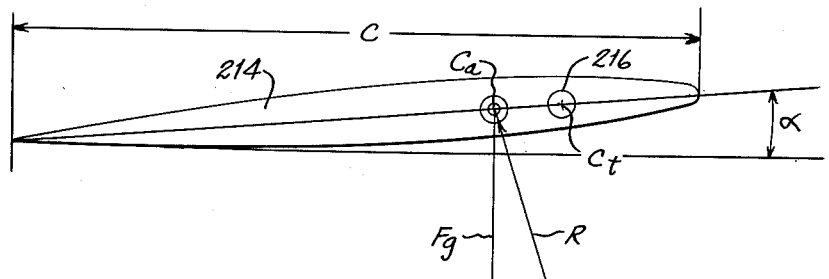
FIGURE 20 shows the conditions prevailing in a single tension filament type of flexible blade.
Figure 21:
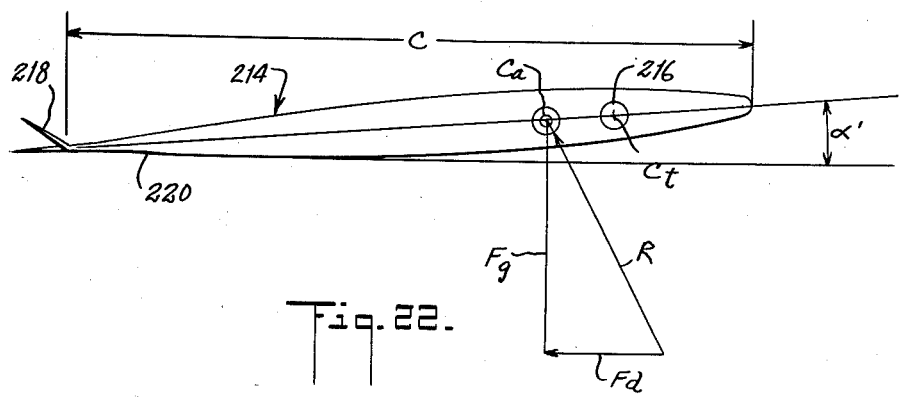
FIGURE 21 illustrates the conditions prevailing within a flexible blade when a control tab is actuated.
Figure 22:
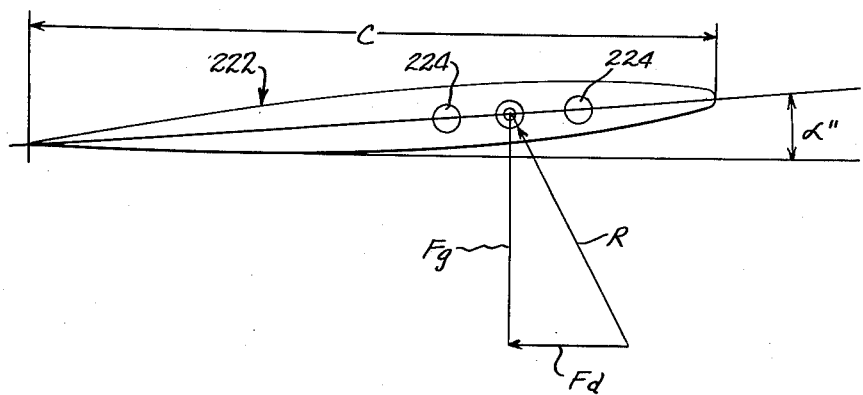
FIGURE 22 illustrates a multiple tension filament type of blade in which substantial spacing between the tension elements exist.

FIGS. 20, 21 and 22 illustrate the various forces that must be considered in the design of the flexible blade of this invention.

FIG. 20 illustrates the conditions prevailing with a single tension member, i.e. single filament type of blade 214. The centroid of the blade 214 is located at the aerodynamic center $C_a$ and the effective torsional axis $C_t$ at the filament 216, somewhat forward of this position. The vector diagram shows that the drag forces $F_d$ and the force of gravity $F_g$ will tend to produce a moment that would produce a rotation about the torsional axis $C_t$ to reduce the angle of attack $\alpha'$ to zero moment and in the case of the symmetrical airfoil shown to zero lift. Since this type of blade can have no centrifugal torsional bias, the blade 214 requires a control tab 218 biased in an upwardly direction to produce a downward force on the trailing portion 220 of the blade 214 as shown in FIG. 21. Thus, there will be established a counter-moment to ensure that the blade 214 maintains a somewhat positive angle of attack $\alpha'$.

In the bifilar or multiple tension filament type of blade 222, as illustrated in FIG. 22, the tension filaments 224 are discrete. By proper spacing of the tension filaments 224 the blade 222 may be designed to maintain an effective angle of attack $\alpha''$ without the aid of a control tab along the medial portion of the blade 222. Investigations carried out on various constructions indicate that a flexible blade designed in accordance with the above principles may be made to satisfy the dynamic and flutter equations and at the same time provide the control of an aircraft having a rotor system which employs nonself-sustaining blades.

An example of how the centrifugal stiffness of the flexible blade of this invention operates to effect control over the entire length of the blade is shown in FIG. 23. Since the bifilar or multiple tension filaments 224 are rigidly attached to the stiff connecting portion 202 of the nacelle 200 as herein discussed, and due to the centrifugal force produced by the rotating mass of the nacelle, any change of the angular relationship with respect to a horizontal plane of the nacelle will cause a corresponding change in the angular position of the blade 222'. If the control surfaces are elevated, causing the nacelle to tilt upwardly, then the angle of attack of the blade 222' will increase by a corresponding amount. Thus, a twist about the torsional axis $C_t$ caused by a new position of the control surfaces will result in a twist of the blade 222' at an intermediate position. In the blade 222' illustrated an upwardly trimmed auxiliary control tab 226 is provided which resists the twisting of the blade 222' and provides a more effective angle of attack of the blade 222' at that point in its length.

In making the blade of this invention, it is important to adhere to the above-mentioned principles since stability of blade performance is necessary to achieve optimum results.

Referring now to FIGURES 24, 25 and 26, the propulsion unit 200 illustrated therein includes a propeller 210 driven by an engine. The propulsion unit 200 has a rigid connecting portion 202 having a blade tip connecting block 203 similar to terminal block 108 and filler plug 110 shown for retaining the root portion of the blade 74 to hub 104 of the reel member 76. The fuel line 204 and electric lines in cables 206 are led directly from the blade tip connecting block and connecting portion 202 to the appropriate portions of the propulsion unit 200. Engine control and elevators 208 may be operated by conventional means. The propeller 210 may be provided with the usual means to vary the effective thrust produced and may include means to automatically feather the propeller 210 when an engine failure occurs. It may be preferable in some instances to provide an engine with a constant speed and one relying on propeller pitch changes to vary the thrust of the propulsion unit. The availability of accurate control of the thrust of each propulsion unit is important in maintaining balance of the rotor system.

FIGURE 25 shows a propulsion unit having a wing-like member 212, of airfoil cross-section, on the outer side of the propulsion unit 200 opposite to the inner connecting portion 202. Since the connecting portion 202 will also preferably have an airfoil section, enough lift force will be produced by the extensions 202 and 212 to facilitate the extension and retraction of the blades at low speeds. In this figure, the tension filaments (170) are indicated, showing their attachment to connecting projection 202.

FIGURE 26 shows the propulsion unit 200 in the at-rest position in which the blade 74, reel member 76 and propulsion unit 200 are at a positive angle of attack $\alpha$, such as the 20° to 35° angle mentioned above.

Changes in the setting of the elevators or control surfaces 208 can twist the blade 74 about the torsional axis $C_t$ and hence vary the pitch of the blade 74. As mentioned above, the changes in pitch may be programmed in advance so that cyclic and collective pitch is achieved in the manner well known in the art in order to control movement in flight.

One of the essential characteristics of the propulsion unit 200 is that it should have sufficient properly distributed mass to stabilize the blade 74 in flight. Due to the construction of the blade 74 as discussed above, substantial stiffness chordwise is built into the blade. However, the centrifugal force of the rotating mass of the propulsion unit 200 must be relied on to give the blade 74 a longitudinal stiffness to develop aerodynamic forces sufficient to lift the aircraft and load.

In order to provide for simplicity of control and reduce the time necessary for training an operator to fly the aircraft of this invention a tilting platform type of control is provided. In FIGS. 27 and 28 the elements of the operator's controls are illustrated. The pilot is illustrated as standing on a tilting platform 228 and holding an azimuth control member 230. The azimuth control 230 is adapted to be rotated in a horizontal plane and, through suitable linkage, to vary the effective torque of the tail rotor 48 or other anti-torque device, and hence control the direction the operator is facing.

The tilting platform 228 is mounted on a support 232 which is a part of the operator's space 54 and is used to provide the pilot commands to vary the roll or pitch of the aircraft about the axis O—O.

As seen in FIG. 28, the tilting platform 228 rests directly on a knife edge fulcrum 234. Springs 236 restrain the rocking motion of the platform 228 so that positive movements are necessary in order to introduce commands to the control system. A potentiometer 238 is provided which transmits a proportional control input to the control system discussed below. Stops 240 are provided to limit the total angular movement of the platform 228.

The tilting platform system, just described, relies on the natural kinesthetic sense of balance of the pilot to introduce the necessary control commands to the control system.

A control panel 242 is provided with the necessary controls for changes of pitch, speed and the like as well as the instruments which are customarily provided. In addition there may be provided an automatic pilot type of device which, by means well-known in the art, will reduce the efforts of the pilot in normal conditions of flight. While in the primary hovering mode of operation the pilot by his instinctive response may be expected to control the aircraft. In forward flight, the automatic pilot means may be relied on, with the pilot selecting one of several modes of operation available. A seat 233 is provided for the pilot so that he may rest while the automatic pilot controls the flight.

Referring now to FIGS. 29, 30 and 31, one of the greatest difficulties with large helicopters has been static droop of large rotor blades. When employing the customary type of rotor blade 304 there is substantial static droop as shown in FIG. 31. Problems of ground clearance, hangar storage space, high flexural stresses, both static and dynamic have effectively limited the practical rotor radius that could be achieved with conventional blades.

The compact rotor system of this invention eliminates these problems. The rotor radius may be substantially greater than any heretofore achieved. As seen in FIGS. 29 and 30, when at rest the blade 306 is wound on reel 308 and the propulsion unit 310 rests on the reel support arms 312. When extended the blade 306 and propulsion unit 310 take the position as illustrated by the dotted lines of FIG. 30. The mass of the propulsion unit 310 tends to flatten out the upward curve of the blade 306 and aids in insuring a stable mode of operation.

Thus a rotary wing system is provided that may have an effective radius as large as desired. By enlarging the possible rotor disc area, disc loadings may be reduced below any available heretofore. By eliminating the need for structural stiffness, the advantages of thin airfoils and low solidities and low tip speeds may be achieved. At each point in the aircraft substantially less in structure is required. The savings in empty weight when combined with the reduced rotor disc loading capabilities, result in an efficiency in operation many times that of conventional rotary wing aircraft.

There has been described above means for twisting the blade about its torsional axis in order to control collective and cyclic pitch. The means referred to above depend upon the use of control surfaces on the nacelle which is rigidly attached to the tip portion of the blade and also the use of control tabs on the trailing edge of the blade at medial points thereof. There is illustrated in FIGURES 32, 33 and 34 alternate means for providing for cyclic and collective pitch control.

The flexible blade 318 is connected to the connecting portion 320 as seen in FIGURE 32 in the same manner as has been described above, including the tension filaments (not shown). Connecting portion 320 is rotatably mounted in the side of the nacelle 322. The axis of rotation of the connecting portion 320 is such that the blade 318 and the connecting portion 320 rotate about a spanwise axis.

The connecting portion 320 has a connecting shaft 324 rigidly attached thereto which extends through the side 326 of the nacelle 322. The shaft 324 is journaled in a bearing assembly 328 which is in turn held in place against radial thrust by a bearing retainer 330. The bearing retainer 330 is connected to the nacelle 322 by means of bolts 332 which extend through the side 326 of the nacelle 322. A lock nut 334 is provided so that the bearing assembly 328 will remain in its proper position under the thrust forces involved.

A blade pitch actuating arm 336 is attached to the end of the shaft 324 by means of a bolt 338. An actuator link rod 342 is pivotally connected to the end of the blade pitch actuating arm 336 and is connected at its other end to an actuator element 344 which may be electromechanically or hydraulically actuated.

Cyclic and collective pitch control commands are fed to the actuator 344 by means of the leads in the blade 318 and connecting portion 320. The relative pitch of the nacelle 322 and blade 318 may then be adjusted for desired changes in cyclic and collective pitch.

The skin 346 of the nacelle 322 has an opening therein through which the connecting portion 320 extends. A seal 348 is bonded to the skin 346 and the surface of the connected portion 320 in such a manner as to seal the opening in the skin 330. The fuel line and electric leads are brought into the nacelle 322 through a hollow portion of the shaft 324.

In the embodiment illustrated in FIGURES 32, 33 and 34, the nacelle 322 may be designed to fly at the constant attitude which is at or near the attitude at which a minimum drag loss occurs. The angle of attack of the blade 318 and connecting portion 320 is varied independently of the nacelle 322. This means of providing for cyclic and collective pitch may be used alone, or with control surfaces on the nacelle or with control tabs on the blade 318, as desired.

While the rotary wing system is useful in an aircraft of the type described above, it will be appreciated that it may be adapted for use in many other ways. For example, there is illustrated in FIGS. 35 and 36 an embodiment of a rotor system 314, in accordance with the teachings of this invention, in a composite aircraft 316. The dotted lines illustrate that the rotor system 314 may be mounted on a retractable pylon and hence lowered into the body of the composite aircraft 316 when the high speed forward mode of operation is desired. The advantages of vertical take off may thus be achieved. The high drag loss penalty in forward flight resulting from a non-retractable rotor system attached to a composite aircraft is thus avoided.

Figure 2:
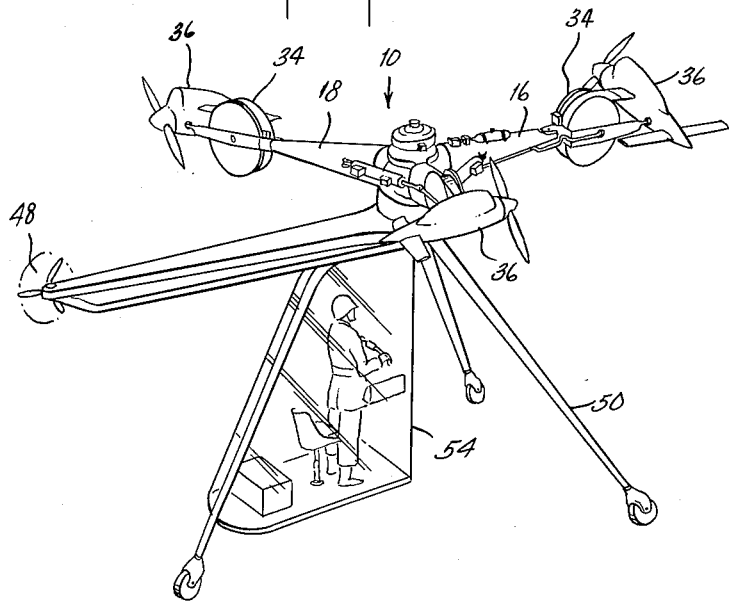
FIGURE 2 is a perspective view of one embodiment of the rotary wing aircraft of this invention as seen in FIGURE 1.

FIGURE 37 is a schematic block diagram of the hydraulic system of the aircraft illustrated in FIGURES 1 and 2. A reservoir 242 is provided as discussed above. The hydraulic pump 244, adapted to receive its power from the rotation of the hub 10 of the illustrated aircraft, is designed to produce sufficient hydraulic pressure to operate the various portions of the hydraulic system. A high pressure accumulator 246 is used to store up pressure energy for use when needed. A pressure relief, bypass and check valve 248 and pressure regulator 250 are designed to equalize the pressure throughout the system. Lag actuators 252, as described above, are relied on to maintain balance in the rotor system. A flow divider 254, provides the radius control actuators 256 with the hydraulic pressure required to achieve the retraction and extension of the rotor blades as discussed above in connection with radius control actuators 82 (FIGURES 5 and 6). The lag actuators 252 receive their commands from the lag sensors hereinabove described. In addition, the radius control actuators 256 receive their commands from the pilot or automatic pilot, and are designed to produce a retracting force so that if the centrifugal force produced by the rotor blades and propulsion units does not exceed some fixed design point the propulsion units remain in the at rest position or will be retracted if at an extended position. The system is a closed one as illustrated.

Referring now to FIGURE 38 in which a schematic wiring and block diagram for the electrical control system of the aircraft of this invention is illustrated, a battery 258 is provided along with a generator 260 and generator control 262. The various components that make up the remainder of the electrical system are shown in blocks outlined by dotted lines and are labeled. The elements of the Vertcial Flight Control and Power Section are ignition controls 264, one for each of the three engines illustrated in the aircraft of FIGURES 1 and 2 and throttle actuators 266, both of which are under the control of the pilot for block or individual control. There is also provided a rotor speed sensor 268 and an automatic lift control element 270.

Translation Control for providing forward, aft, left or right movement in flight is provided by means of control surface actuators 272, a roll control element 274 and a pitch control element 276.

The Rotor Balancing System comprises lag sensors 278, flapping sensors 280, and balancing accelerometers 282 (in the plane of rotation of the rotor system). Lag control elements 284 are used to supply commands to the hydraulic lag actuators 252 described above. A rotor speed sensor 286 and a rotor radius control element 288 are also provided.

The Rotor Radius Control is effected by radius control elements 290 for each of the hydraulic radius control actuators 256 described above. A rotor radius sensor 292 is provided in order to determine the effective radius of each blade.

Azimuth and Retraction Torque Control for the tail rotor 48 is provided by tail rotor control element 294 and a gyro-magnetic sensor 296.

An altitude sensor 298 is provided and an instrument panel 300. The pilot may control all phases of operation through the pilot control element 302 and it will be appreciated that an automatic pilot may be a portion of this last mentioned control element.

The design and function of the various components of the control systems described above is conventional and it will be possible, for the most part, to use standard components. The control systems described above are illustrative only and may be varied in accordance with the requirements of any rotary wing aircraft using the rotary wing system of this invention.

The propulsion units discussed and illustrated are engines having propellers. It will be appreciated that turbo-jet engines, having their exhaust outlets arranged to exhaust at a tangent to the swept disc area may be used just as well. The only important requirement is that the propulsion unit have sufficient properly distributed mass to produce enough centrifugal force to maintain the required centrifugal stiffness of the rotor blade.

While particular embodiments of this invention have been illustrated and described, it will be appreciated by those skilled in the art that there are many modifications which can be made which will not depart from the spirit of this invention, nor from the scope of the appended claims.

What is claimed is:

1. A rotary wing aircraft comprising a rotatable hub, flexible statically limp blades anchored at their inner ends to said hub, said blades comprising an elongated airfoil member, said member being flexurally elastic but longitudinally inelastic, and propulsion devices secured to said blades at points outwardly from said hub for rotating said blades and hub and maintaining said blades in extended position for aerodynamic support of said aircraft.

2. A rotary wing aircraft as set forth in claim 1 including means for controlling the propulsive power of said propulsion devices.

3. A rotary wing aircraft as set forth in claim 1 wherein said blades are of uniform airfoil configuration throughout substantially their entire length.

4. A rotary wing aircraft as set forth in claim 1 wherein said propulsion devices are of streamline exterior and have control tabs thereon for varying the angle of incidence of said propulsion devices.

5. A rotary wing aircraft as set forth in claim 1 wherein said propulsion devices are of streamline exterior and have control tabs thereon for varying the angle of incidence of said propulsion devices, and comprising means for varying the angle of incidence of said propulsion devices with respect to said blades.

6. A rotary wing aircraft as set forth in claim 1 in which there are flexible substantially non-extensible reinforcing elements extending from and connected to said hub and to said propulsion devices for limiting the lengthwise extension of said blades.

7. A rotary wing aircraft as set forth in claim 6 wherein said reenforcing elements are mounted within the interior of said blades.

8. A rotary wing aircraft as set forth in claim 6 wherein at least one of said blades is provided with a pair of said reenforcing elements, one near the forward edge of said blade, the other spaced rearwardly therefrom.

9. A rotary wing aircraft as set forth in claim 6 wherein at least one of said blades is provided with three or more of said reenforcing elements, one near the forward edge of said blade, the others rearwardly thereof and spaced chordwise from one another.

10. A rotary wing aircraft as set forth in claim 1 having control tabs associated with at least one of said propulsion devices for varying the angle of incidence thereof and of the portions of the blade adjacent thereto.

11. A rotary wing aircraft as set forth in claim 10 in which there are remote control means for said control tabs.

12. A rotary wing aircraft as set forth in claim 1, said propulsion devices each comprising a nacelle having a rigid inwardly extending airfoil-shaped projection on one side for attachment to said blade and a rigid outwardly projecting airfoil-shaped projection on the other side for balancing the aerodynamic effect of said inner projection.

13. A rotary wing aircraft as set forth in claim 1 having adjustable control tabs mounted on at least one of said blades for varying the angle of incidence of said blade.

14. A rotary wing aircraft as set forth in claim 1 having a plurality of spaced adjustable control tabs on at least one of said blades for varying the angle of incidence of said blade.

15. A rotary wing aircraft comprising a rotatable hub, a plurality of reels, each reel mounted on said hub for rotation about its own generally horizontal axis, statically limp blades having their root ends connected to each of said reels and their opposite ends being free to extend outwardly away from said hub during rotation of said blades and hub, said blades comprising an elongated airfoil member, said member being flexurally elastic but longitudinally inelastic, propulsion devices attached to each of said blades adjacent the free ends thereof for causing rotation of said blades and hub when said propulsion devices are operating, and means for actuating said reels for winding said blades onto or off of said reels.

16. A rotary wing aircraft as set forth in claim 15 having independent means adjacent at least one of the reels for guiding an edge of the blade during reel-in and reel-out travel of said blade.

17. A rotary wing aircraft as set forth in claim 15 in which the reels have an inner supporting hub portion whose outer surface is conformed in shape to the airfoil shape of the contacting surface of said blades.

18. A rotary wing aircraft comprising a rotatable hub having a plurality of arm portions, one of said arm portions being adjustably positioned with respect to the axis of the hub, a plurality of blades connected to said arm portions for rotation with said arm portions and hub, propulsion devices connected to said blades near the outer ends thereof, and means associated with said arm portions to position said adjustable arm portion for maintaining a balance of the forces transmitted to said hub by said blades when rotating.

19. A rotary wing system for aircraft including a rotatable hub having a plurality of arm portions, one of said arm portions being adjustably positioned with respect to the axis of the hub, a plurality of statically non-self-sustaining blades of variable radii each connected to one of said arm portions for rotation with said arm portion and hub, propulsion devices connected to said blades near the outer ends thereof, and means associated with said arm portions to position said adjustable arm portion for maintaining a balance of the forces transmitted to said hub by said blades when rotating.

20. A rotary wing aircraft comprising a rotatable hub having at least one fixed arm portion and at least one arm portion hinged on a vertical axis offset from the hub axis, a statically nonself-sustaining and variable radius blade connected to each of said arm portions, radius control means for said blades, propulsion devices connected to said blades at a location near the outer ends thereof, and means extending between said fixed and hinged arm portions to change the relative positions thereof for maintaining a balance of the forces transmitted to said hub by said blades when rotating, 21. A rotary wing aircraft comprising a rotatable hub having a plurality of arm portions extending outwardly from the axis of rotation thereof, reels rotatably supported on said arm portions and spaced from and circumferentially about said axis of rotation, a plurality of statically limp flexible blades each connected at their root ends to one of said reels to be wound thereon, propulsion devices connected to said blades near the outer ends thereof, means for actuating said reels to cause said blades to be wound onto and off of said reels to vary the radius thereof, and means for controlling said reel actuating means.

22. A rotary wing aircraft comprising a hub rotatable about a normally-vertical axis, a plurality of reels rotatably mounted on said hub and formed with leading and trailing side flanges, limp flexible blades having leading and trailing edges and root end connections with said reels between said side flanges, means for actuating said reels to wind said blades onto and off of said reels to vary the radius thereof, each of said reels having a normally-horizontal axis of rotation which is at a sufficient angle to the line of tangency passing through the center of said reel to prevent the trailing edge of the blade connected to said reel from contacting the trailing side flanges thereof, and propulsion devices connected to said blades near the outer ends thereof.

23. A rotary wing aircraft as set forth in claim 22 wherein the normally-horizontal axis of rotation of said reels is at an angle of between about 20° and 35° to said line of tangency.

24. A rotary wing aircraft comprising a rotatable hub, reels rotatably mounted on said hub, limp flexible blades having root end connections with said reels, propulsion devices connected to the radially outward portions of said blades, said reels including flange portions and a central blade support portion, actuating means for said reels to wind said blades onto and off of said reels to vary the radius thereof comprising worm gears carried by said hub and cooperating worm wheels fixedly mounted on each of said reels.

25. A rotary wing aircraft comprising a rotatable hub, reels rotatably mounted on said hub, limp flexible blades having root end connections with said reels, propulsion devices connected to the radially outward portions of said blades, and power actuated means for rotating each of said reels to wind or unwind said blades thereon to vary the radius thereof, said power actuated means exerting a predetermined restraining force on said reels to prevent the unwinding of said blades until the centrifugal force created by said blades and propulsion devices is sufficient to maintain said blades in a flying attitude and to retract said blades when said centrifugal force is less than said predetermined restraining force.

26. A rotary wing aircraft comprising a rotatable hub, reels rotatably mounted on said hub, limp flexible blades having root end connections with said reels, propulsion devices connected to the radially outward portions of said blades, and power-driven actuating means for said reels to wind said blades onto and off of said reels to vary the radius thereof.

27. A rotary wing aircraft as set forth in claim 26 wherein said actuating means is constructed for substantially uniform operation to cause the simultaneous winding or unwinding of said blades on their respective reels.

28. A rotary wing aircraft as set forth in claim 26 having means for the individual control of said power-driven means for at least one of said reels.

29. A rotary wing aircraft comprising a fixed shaft, a rotatable hub journaled on and supported by said shaft, a plurality of arm portions extending outwardly from the axis of rotation of said hub and formed with liquid fuel storage reservoirs, statically limp flexible rotor blades, propulsion means comprising propeller-type liquid fuel consuming aircraft engines connected to the outer end portions of said rotor blades, adjustable radius control means attached to the root end of each of said blades and supported upon said arm portions, and conduit means integral with said rotor blades for conveying liquid fuel from said reservoirs to said engines.

30. A rotary wing aircraft comprising a rotatable hub, a rotatable reel supported thereby, a limp rotor blade having a root end connection with said reel and having continuous flexibility to enable it to be wound on or off of said reel, reel actuator means for varying the effective radius of said rotor blade, a propulsion device mounted in a nacelle and connected to said blade adjacent the tip portion thereof, and means for firmly supporting said nacelle adjacent said reel when the blade is in reeled-in position.

31. A rotary wing aircraft as set forth in claim 30 in which said nacelle supporting means comprises arms projecting outwardly from said hub and openings in said nacelle formed and positioned to receive said arms when said blade is in reeled-in position.

32. A rotary wing aircraft comprising a fixed supporting shaft, a rotatable hub journaled on and supported on said shaft, a plurality of statically limp continuously flexible and variable radius rotor blades carried by said hub, power actuated devices for varying the radius of said blades, controllable propulsion devices carried by each of said rotor blades at a location on said blades spaced from the axis of rotation of the hub, electrical and hydraulic actuating means for controlling the operation of said propulsion devices and an electric generator and a hydraulic pressure pump operated by relative rotation between said fixed shaft and said hub, and means for conveying said electric power and hydraulic pressure to the control means and propulsion devices of said aircraft.

33. In a rotary wing aircraft in combination, a rotor blade having at one end thereof means for attachment of said blade to a rotating hub member, said blade having throughout the major portion of its length an airfoil configuration in planes at right angles to its length, substantial structural inextensibility in the direction of its length, and sufficient continuous flexural elasticity so that said blade may be smoothly rolled upon itself with successive courses of said roll in contact with each other, and a propulsion unit attached adjacent the other end of said blade for propelling said blade and keeping it taut during rotation.

34. In a rotary wing aircraft the combination set forth in claim 33 wherein said airfoil configuration comprises a leading portion having thin cambered shape extending over 50 to 60% of the chord dimension and a trailing portion having a thin tapering reverse cambered shape extending over the remainder of the chord dimension.

35. In a rotary wing aircraft the combination set forth in claim 33 wherein said airfoil configuration comprises a leading portion having a positively cambered shape not exceeding in thickness about 2 to 6% of the chord dimension, and a trailing portion having a reverse cambered shape of thickness less than the thickness of the leading portion extending over the remainder of the chord dimension and terminating in a pointed trailing edge.

36. A rotor blade having at one end thereof means for attaching said blade to a rotating hub and at the other end means for attaching to the blade a propulsion device, said blade intermediate said attachment means having an airfoil configuration in planes at right angles to its length and comprising thin covering sheets of flexible material forming the top and bottom surfaces of the blade, compressible filler material between said sheets, and at least one substantially inextensible flexible filament extending throughout the length of said blade and secured at each of its ends to one of said attachment means.

37. A rotor blade as set forth in claim 36 wherein the filler material is adapted to compress when the blade is rolled upon itself and to expand the sheets to airfoil configuration when the blade is tensioned in the direction of its length.

38. A rotor blade as set forth in claim 36 wherein there are a plurality of inextensible filaments each extending throughout the length of said blade and each secured at each of its ends to one of said attachment means.

39. A rotor blade as set forth in claim 36 having control tabs located along the trailing edge of the airfoil configuration at predetermined points to vary the effective lift of said blade at said points.

40. A rotor blade as set forth in claim 36 wherein the effective torsional axis of said blade is forward of both the aerodynamic center and the center of gravity of the blade.

41. In a rotary wing aircraft, a rotary wing assembly comprising rotative lifting and propelling blades, said blades having an effective aerodynamic shape and a maximum thickness not exceeding about 6% of the chord dimension, and a propulsion unit mounted at one end of each blade, said assembly having a variable lift thrust and a disc loading of less than one pound per square foot of disc area.

42. A rotor blade for a rotary wing aircraft having a substantially uniform cross-section throughout the radius thereof, flexibility with respect to the longitudinal dimension thereof, so that said blade may be coiled into a coil comprising several thicknesses of blade, substantially inflexible with respect to the chordwise dimension thereof under normal aerodynamic forces and substantially inextensible, said blade having an airfoil shape comprising a leading portion having thin cambered shape extending over 50 to 60% of the chord dimension and having a trailing portion having a tapering reverse cambered shape extending over the remainder of the chord dimension, said blade being formed of thin flexible covering sheets having substantially more flexibility with respect to the longitudinal dimension than with respect to the chordwise dimension, a first filler material in said leading portion and a plurality of tension filaments moulded therein extending throughout the length thereof, and a second filler material in said trailing portion having a specific weight less than said first compressible material, and a propulsion unit attached to said blade and to said tension filaments adjacent the tip portion of said blade for propelling the same and maintaining it taut.

References Cited in the file of this patent

UNITED STATES PATENTS

| | | |
|---|---|---|
| 1,786,545 | Noeggerath | Dec. 30, 1930 |
| 2,120,168 | Ash | June 7, 1938 |
| 2,172,334 | Theodorsen et al. | Sept. 5, 1939 |
| 2,226,978 | Pescara | Dec. 31, 1940 |
| 2,330,803 | Andrews | Oct. 5, 1943 |
| 2,614,636 | Prewitt | Oct. 21, 1952 |
| 2,624,531 | Stalker | Jan. 6, 1953 |
| 2,626,766 | McDonald | Jan. 27, 1953 |
| 2,630,709 | Hoffman et al. | Mar. 10, 1953 |
| 2,717,043 | Isacco | Sept. 6, 1955 |
| 2,847,173 | McCarty | Aug. 12, 1958 |

FOREIGN PATENTS

| | | |
|---|---|---|
| 477,862 | Italy | Feb. 10, 1953 |